(12) United States Patent
Forstall et al.

(10) Patent No.: US 8,543,931 B2
(45) Date of Patent: Sep. 24, 2013

(54) PREVIEW INCLUDING THEME BASED INSTALLATION OF USER INTERFACE ELEMENTS IN A DISPLAY ENVIRONMENT

(75) Inventors: Scott Forstall, Mountain View, CA (US); Imran A. Chaudhri, San Francisco, CA (US); John O. Louch, San Luis Obispo, CA (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 540 days.

(21) Appl. No.: 11/282,110

(22) Filed: Nov. 16, 2005

(65) Prior Publication Data

US 2007/0101288 A1    May 3, 2007

Related U.S. Application Data

(63) Continuation-in-part of application No. 11/148,010, filed on Jun. 7, 2005.

(60) Provisional application No. 60/734,016, filed on Nov. 4, 2005, provisional application No. 60/730,956, filed on Oct. 27, 2005.

(51) Int. Cl.
*G06F 3/00* (2006.01)

(52) U.S. Cl.
USPC ........... 715/762; 715/779; 715/781; 715/866; 717/174

(58) Field of Classification Search
USPC .......................................... 715/762
See application file for complete search history.

(56) References Cited

U.S. PATENT DOCUMENTS

| 4,752,893 | A | 6/1988 | Guttag et al. |
| 5,168,441 | A | 12/1992 | Onarheim et al. |
| 5,289,574 | A | 2/1994 | Sawyer |
| 5,297,250 | A | 3/1994 | Leroy et al. |
| 5,351,995 | A | 10/1994 | Booker |

(Continued)

FOREIGN PATENT DOCUMENTS

| DE | 102 42 378 | 3/2004 |
| EP | 548586 | 6/1993 |

(Continued)

OTHER PUBLICATIONS

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.

(Continued)

*Primary Examiner* — Alvin Tan
(74) *Attorney, Agent, or Firm* — Fish & Richardson P.C.

(57) ABSTRACT

Methods, apparatus, and computer program products are provided including a method for displaying a user interface element in a display environment. The method includes receiving a selection of a user interface element to be displayed in a display environment, and selectively displaying the user interface element in a preview environment prior to installing the user interface element and prior to displaying the interface element in the display environment. Preview includes instantiating the user interface element in a preview environment including displaying the user interface element in a presentation window along with a preview designator and supporting interaction of the user interface element with a user; and selectively installing the user interface element in the display environment.

55 Claims, 14 Drawing Sheets

(56) References Cited

U.S. PATENT DOCUMENTS

| | | | |
|---|---|---|---|
| 5,357,603 A | 10/1994 | Parker | |
| 5,379,057 A | 1/1995 | Clough et al. | |
| 5,388,201 A | 2/1995 | Hourvitz et al. | |
| 5,416,890 A | 5/1995 | Beretta | |
| 5,481,665 A | 1/1996 | Okada et al. | |
| 5,490,246 A | 2/1996 | Brotsky et al. | |
| 5,522,022 A | 5/1996 | Rao et al. | |
| 5,537,630 A | 7/1996 | Berry et al. | |
| 5,564,002 A | 10/1996 | Brown | |
| 5,564,022 A | 10/1996 | Debnath et al. | |
| 5,588,098 A | 12/1996 | Chen et al. | |
| 5,602,997 A | 2/1997 | Carpenter et al. | |
| 5,638,501 A | 6/1997 | Gough et al. | |
| 5,644,737 A | 7/1997 | Tuniman et al. | |
| 5,644,739 A | 7/1997 | Moursund | |
| 5,651,107 A | 7/1997 | Frank et al. | |
| 5,657,049 A | 8/1997 | Ludolph et al. | |
| 5,659,693 A | 8/1997 | Hansen et al. | |
| 5,659,694 A | 8/1997 | Bibayan | |
| 5,666,416 A | 9/1997 | Micali | |
| 5,671,343 A | 9/1997 | Kondo et al. | |
| 5,675,362 A | 10/1997 | Clough et al. | |
| 5,689,664 A | 11/1997 | Narayanan et al. | |
| 5,708,764 A | 1/1998 | Borrel et al. | |
| 5,710,884 A | 1/1998 | Dedrick | |
| 5,721,848 A | 2/1998 | Joseph | |
| 5,727,135 A | 3/1998 | Webb et al. | |
| 5,731,819 A | 3/1998 | Gagne et al. | |
| 5,742,285 A | 4/1998 | Ueda | |
| 5,754,174 A | 5/1998 | Carpenter et al. | |
| 5,760,773 A | 6/1998 | Berman et al. | |
| 5,764,229 A | 6/1998 | Bennett | |
| 5,764,238 A | 6/1998 | Lum et al. | |
| 5,790,120 A | 8/1998 | Lozares et al. | |
| 5,793,376 A | 8/1998 | Tanaka et al. | |
| 5,796,402 A | 8/1998 | Ellison-Taylor | |
| 5,801,703 A | 9/1998 | Bowden et al. | |
| 5,835,692 A | 11/1998 | Cragun et al. | |
| 5,835,693 A | 11/1998 | Lynch et al. | |
| 5,838,316 A | 11/1998 | Arruza | |
| 5,870,734 A * | 2/1999 | Kao | 707/2 |
| 5,877,741 A | 3/1999 | Chee et al. | |
| 5,877,762 A | 3/1999 | Young | |
| 5,878,219 A | 3/1999 | Vance, Jr. et al. | |
| 5,883,639 A | 3/1999 | Walton et al. | |
| 5,900,876 A | 5/1999 | Yagita et al. | |
| 5,903,896 A * | 5/1999 | Waldman et al. | 707/200 |
| 5,917,436 A | 6/1999 | Endo et al. | |
| 5,920,659 A | 7/1999 | Iverson et al. | |
| 5,929,852 A | 7/1999 | Fisher et al. | |
| 5,933,148 A | 8/1999 | Oka et al. | |
| 5,949,409 A | 9/1999 | Tanaka et al. | |
| 5,963,191 A | 10/1999 | Jaaskelainen, Jr. | |
| 5,978,579 A | 11/1999 | Buxton et al. | |
| 5,999,948 A | 12/1999 | Nelson et al. | |
| 6,005,568 A | 12/1999 | Simonoff et al. | |
| 6,006,231 A | 12/1999 | Popa | |
| 6,011,562 A | 1/2000 | Gagne et al. | |
| 6,031,937 A | 2/2000 | Graffagnino | |
| 6,045,446 A | 4/2000 | Ohshima | |
| 6,061,695 A | 5/2000 | Slivka et al. | |
| 6,075,543 A | 6/2000 | Akeley | |
| 6,128,010 A | 10/2000 | Baxter et al. | |
| 6,133,915 A | 10/2000 | Arcuri et al. | |
| 6,144,381 A | 11/2000 | Lection et al. | |
| 6,154,601 A | 11/2000 | Yaegashi et al. | |
| 6,166,748 A | 12/2000 | Van Hook et al. | |
| 6,167,533 A | 12/2000 | Potterveld et al. | |
| 6,188,399 B1 * | 2/2001 | Voas et al. | 715/723 |
| 6,191,797 B1 | 2/2001 | Politis | |
| 6,195,664 B1 | 2/2001 | Tolfa | |
| 6,211,890 B1 | 4/2001 | Ohba | |
| 6,246,418 B1 | 6/2001 | Oka | |
| 6,259,432 B1 | 7/2001 | Yamada et al. | |
| 6,266,053 B1 | 7/2001 | French et al. | |
| 6,266,430 B1 | 7/2001 | Rhoads | |
| 6,272,484 B1 | 8/2001 | Martin et al. | |
| 6,272,558 B1 | 8/2001 | Hui et al. | |
| 6,275,831 B1 | 8/2001 | Bodnar et al. | |
| 6,278,448 B1 | 8/2001 | Brown et al. | |
| 6,278,450 B1 | 8/2001 | Arcuri et al. | |
| 6,300,947 B1 | 10/2001 | Kanevsky | |
| 6,304,684 B1 | 10/2001 | Niczyporuk et al. | |
| 6,307,574 B1 | 10/2001 | Ashe et al. | |
| 6,310,621 B1 | 10/2001 | Gagne et al. | |
| 6,311,232 B1 | 10/2001 | Cagle et al. | |
| 6,313,851 B1 | 11/2001 | Matthews, III et al. | |
| 6,321,314 B1 | 11/2001 | Van Dyke | |
| 6,333,753 B1 | 12/2001 | Hinckley | |
| 6,344,855 B1 | 2/2002 | Fisher et al. | |
| 6,353,437 B1 | 3/2002 | Gagne | |
| 6,369,823 B2 | 4/2002 | Ohba | |
| 6,369,830 B1 | 4/2002 | Brunner et al. | |
| 6,396,520 B1 | 5/2002 | Ording | |
| 6,401,104 B1 | 6/2002 | LeRue et al. | |
| 6,411,274 B2 | 6/2002 | Watanabe et al. | |
| 6,411,301 B1 | 6/2002 | Parikh et al. | |
| 6,412,021 B1 | 6/2002 | Nguyen et al. | |
| 6,421,058 B2 | 7/2002 | Parikh et al. | |
| 6,424,348 B2 | 7/2002 | Parikh | |
| 6,434,744 B1 * | 8/2002 | Chamberlain et al. | 717/168 |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,466,237 B1 | 10/2002 | Miyao et al. | |
| 6,469,714 B2 | 10/2002 | Buxton et al. | |
| 6,483,524 B1 | 11/2002 | Petchenkine et al. | |
| 6,484,261 B1 | 11/2002 | Wiegel | |
| 6,487,560 B1 | 11/2002 | LaRue et al. | |
| 6,489,963 B2 | 12/2002 | Parikh et al. | |
| 6,512,522 B1 | 1/2003 | Miller et al. | |
| 6,515,682 B1 | 2/2003 | Washington et al. | |
| 6,525,736 B1 | 2/2003 | Erikawa et al. | |
| 6,526,174 B1 | 2/2003 | Graffagnino | |
| 6,535,892 B1 | 3/2003 | LaRue et al. | |
| 6,536,041 B1 | 3/2003 | Knudson et al. | |
| 6,542,160 B1 | 4/2003 | Abgrall | |
| 6,542,166 B1 | 4/2003 | Washington et al. | |
| 6,544,295 B1 | 4/2003 | Bodnar | |
| 6,571,328 B2 | 5/2003 | Liao et al. | |
| 6,573,896 B1 | 6/2003 | Ribadeau Dumas et al. | |
| 6,577,317 B1 | 6/2003 | Duluk, Jr. et al. | |
| 6,580,430 B1 | 6/2003 | Hollis et al. | |
| 6,590,592 B1 | 7/2003 | Nason et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,661,426 B1 | 12/2003 | Jetha et al. | |
| 6,664,958 B1 | 12/2003 | Leather et al. | |
| 6,664,962 B1 | 12/2003 | Komsthoeft et al. | |
| 6,664,986 B1 | 12/2003 | Kopelman et al. | |
| 6,674,438 B1 | 1/2004 | Yamamoto et al. | |
| 6,697,074 B2 | 2/2004 | Parikh et al. | |
| 6,707,462 B1 | 3/2004 | Peercy et al. | |
| 6,714,201 B1 | 3/2004 | Grinstein et al. | |
| 6,714,221 B1 | 3/2004 | Christie et al. | |
| 6,715,053 B1 | 3/2004 | Grigor | |
| 6,717,599 B1 | 4/2004 | Olano | |
| 6,724,403 B1 | 4/2004 | Santoro et al. | |
| 6,734,864 B2 | 5/2004 | Abgrall | |
| 6,738,804 B1 | 5/2004 | Lo | |
| 6,741,242 B1 | 5/2004 | Itoh et al. | |
| 6,742,042 B1 | 5/2004 | Orton et al. | |
| 6,757,693 B1 | 6/2004 | Welsh et al. | |
| 6,757,698 B2 | 6/2004 | McBride et al. | |
| 6,760,046 B2 | 7/2004 | I'Anson et al. | |
| 6,765,592 B1 | 7/2004 | Pletcher et al. | |
| 6,788,318 B2 | 9/2004 | Chen | |
| 6,792,616 B1 | 9/2004 | Jerding et al. | |
| 6,806,892 B1 | 10/2004 | Plow et al. | |
| 6,882,979 B1 * | 4/2005 | Reay et al. | 705/26 |

| | | | | | |
|---|---|---|---|---|---|
| 6,892,360 B1 | 5/2005 | Pabla et al. | 2003/0018971 A1 | 1/2003 | McKenna, Jr. |
| 6,906,720 B2 | 6/2005 | Emberling et al. | 2003/0020671 A1 | 1/2003 | Santoro et al. |
| 6,910,000 B1 | 6/2005 | Yedidia et al. | 2003/0032409 A1 | 2/2003 | Hutcheson et al. |
| 6,911,984 B2 | 6/2005 | Sabella et al. | 2003/0046316 A1 | 3/2003 | Gergic et al. |
| 6,918,091 B2 | 7/2005 | Leavitt et al. | 2003/0061482 A1 | 3/2003 | Emmerichs |
| 6,931,633 B1 | 8/2005 | Vazquez et al. | 2003/0067489 A1 | 4/2003 | Candy Wong et al. |
| 6,944,829 B2 | 9/2005 | Dando | 2003/0069904 A1 | 4/2003 | Hsu et al. |
| 6,993,721 B2 | 1/2006 | Rosin et al. | 2003/0076369 A1 | 4/2003 | Resner et al. |
| 7,007,242 B2 | 2/2006 | Suomela et al. | 2003/0080995 A1 | 5/2003 | Tenenbaum et al. |
| 7,016,011 B2 | 3/2006 | De Haan | 2003/0097659 A1 | 5/2003 | Goldman |
| 7,024,381 B1 | 4/2006 | Hastings et al. | 2003/0101046 A1 | 5/2003 | Krasnov |
| 7,027,055 B2 | 4/2006 | Anderson et al. | 2003/0122787 A1 | 7/2003 | Zimmerman et al. |
| 7,028,264 B2 | 4/2006 | Santoro et al. | 2003/0123739 A1 | 7/2003 | Graffagnino |
| 7,036,083 B1 | 4/2006 | Zenith | 2003/0146934 A1 | 8/2003 | Bailey et al. |
| 7,050,955 B1 | 5/2006 | Carmel et al. | 2003/0154239 A1 | 8/2003 | Davis et al. |
| 7,076,730 B1 | 7/2006 | Baker | 2003/0158975 A1 | 8/2003 | Frank et al. |
| 7,082,577 B1 * | 7/2006 | Brosnahan ............ 715/860 | 2003/0164862 A1 | 9/2003 | Cadiz et al. |
| 7,085,994 B2 | 8/2006 | Gvily | 2003/0169306 A1 | 9/2003 | Makipaa et al. |
| 7,107,546 B2 | 9/2006 | Coulthard | 2003/0174136 A1 | 9/2003 | Emberling et al. |
| 7,127,473 B2 | 10/2006 | Agassi et al. | 2003/0174154 A1 | 9/2003 | Yukie et al. |
| 7,127,713 B2 | 10/2006 | Davis et al. | 2003/0184552 A1 | 10/2003 | Chadha |
| 7,146,563 B2 | 12/2006 | Hesmer et al. | 2003/0184584 A1 | 10/2003 | Vachuska et al. |
| 7,174,512 B2 | 2/2007 | Martin et al. | 2003/0191799 A1 | 10/2003 | Araujo et al. |
| 7,185,290 B2 | 2/2007 | Cadiz et al. | 2003/0206195 A1 | 11/2003 | Matsa et al. |
| 7,191,399 B2 | 3/2007 | Ohtani et al. | 2003/0208685 A1 * | 11/2003 | Abdel-Rahman ............ 713/191 |
| 7,222,155 B1 | 5/2007 | Gebhardt et al. | 2004/0003402 A1 | 1/2004 | McKenna, Jr. |
| 7,242,406 B2 | 7/2007 | Robotham et al. | 2004/0012626 A1 | 1/2004 | Brookins |
| 7,249,327 B2 | 7/2007 | Nelson et al. | 2004/0032409 A1 | 2/2004 | Girard |
| 7,260,380 B2 | 8/2007 | Dietl et al. | 2004/0036711 A1 | 2/2004 | Anderson |
| 7,269,792 B2 | 9/2007 | Consolatti et al. | 2004/0039934 A1 | 2/2004 | Land et al. |
| 7,281,202 B2 | 10/2007 | Croney et al. | 2004/0070629 A1 | 4/2004 | Seifert |
| 7,293,034 B2 | 11/2007 | Paya et al. | 2004/0078814 A1 | 4/2004 | Allen |
| 7,315,848 B2 | 1/2008 | Pearse et al. | 2004/0090969 A1 | 5/2004 | Jerrard-Dunne et al. |
| 7,328,435 B2 | 2/2008 | Trifon | 2004/0117831 A1 | 6/2004 | Ellis et al. |
| 7,426,687 B1 | 9/2008 | Schultz et al. | 2004/0119754 A1 | 6/2004 | Bangalore et al. |
| 7,503,010 B2 | 3/2009 | Chaudhri et al. | 2004/0125128 A1 | 7/2004 | Chang et al. |
| 7,530,026 B2 | 5/2009 | Chaudhri et al. | 2004/0179019 A1 | 9/2004 | Sabella et al. |
| 7,546,543 B2 | 6/2009 | Louch et al. | 2004/0183800 A1 | 9/2004 | Peterson |
| 7,614,011 B2 * | 11/2009 | Karidis et al. ............ 715/789 | 2004/0194020 A1 | 9/2004 | Beda et al. |
| 7,761,800 B2 | 7/2010 | Chaudhri et al. | 2004/0205504 A1 | 10/2004 | Phillips |
| 7,765,493 B2 | 7/2010 | Chickles et al. | 2004/0212640 A1 | 10/2004 | Mann et al. |
| 7,793,222 B2 | 9/2010 | Chaudhri et al. | 2004/0215740 A1 | 10/2004 | Frank et al. |
| 7,793,227 B2 | 9/2010 | Wada et al. | 2004/0223003 A1 | 11/2004 | Heirich et al. |
| 7,793,232 B2 | 9/2010 | Chaudhri et al. | 2004/0225955 A1 | 11/2004 | Ly |
| 7,802,246 B1 * | 9/2010 | Kennedy et al. ............ 717/173 | 2004/0230911 A1 | 11/2004 | Bent et al. |
| 7,873,908 B1 | 1/2011 | Varanasi et al. | 2004/0237082 A1 | 11/2004 | Alcazar et al. |
| 7,873,910 B2 | 1/2011 | Chaudhri et al. | 2004/0255253 A1 | 12/2004 | Marcjan |
| 2001/0030647 A1 | 10/2001 | Sowizral et al. | 2004/0261012 A1 | 12/2004 | Balsiger |
| 2001/0035885 A1 | 11/2001 | Iron et al. | 2004/0261037 A1 | 12/2004 | Ording et al. |
| 2002/0013822 A1 | 1/2002 | West | 2004/0261038 A1 | 12/2004 | Ording et al. |
| 2002/0049788 A1 | 4/2002 | Lipkin et al. | 2005/0010419 A1 | 1/2005 | Pourhamid |
| 2002/0054148 A1 | 5/2002 | Okada | 2005/0010634 A1 | 1/2005 | Henderson et al. |
| 2002/0059594 A1 | 5/2002 | Rasmussen et al. | 2005/0021935 A1 | 1/2005 | Schillings et al. |
| 2002/0065946 A1 | 5/2002 | Narayan | 2005/0022139 A1 | 1/2005 | Gettman et al. |
| 2002/0067418 A1 | 6/2002 | I | 2005/0039144 A1 | 2/2005 | Wada et al. |
| 2002/0078453 A1 | 6/2002 | Kuo | 2005/0057497 A1 | 3/2005 | Kawahara |
| 2002/0085037 A1 | 7/2002 | Leavitt et al. | 2005/0060655 A1 | 3/2005 | Gray et al. |
| 2002/0089526 A1 | 7/2002 | Buxton et al. | 2005/0060661 A1 | 3/2005 | Kawahara et al. |
| 2002/0093516 A1 | 7/2002 | Brunner et al. | 2005/0088447 A1 | 4/2005 | Hanggie et al. |
| 2002/0099678 A1 | 7/2002 | Albright et al. | 2005/0088452 A1 | 4/2005 | Hanggie et al. |
| 2002/0105548 A1 | 8/2002 | Hayton et al. | 2005/0091571 A1 | 4/2005 | Leichtling |
| 2002/0112180 A1 | 8/2002 | Land et al. | 2005/0091690 A1 | 4/2005 | Delpuch et al. |
| 2002/0114466 A1 | 8/2002 | Tanaka et al. | 2005/0114021 A1 | 5/2005 | Krull et al. |
| 2002/0120673 A1 | 8/2002 | Tolson et al. | 2005/0144563 A1 | 6/2005 | Hough et al. |
| 2002/0123739 A1 | 9/2002 | Haacke et al. | 2005/0144595 A1 | 6/2005 | McLean |
| 2002/0129092 A1 | 9/2002 | Tolson et al. | 2005/0149458 A1 | 7/2005 | Eglen et al. |
| 2002/0133508 A1 | 9/2002 | LaRue et al. | 2005/0160368 A1 | 7/2005 | Liu et al. |
| 2002/0140740 A1 | 10/2002 | Chen | 2005/0168471 A1 | 8/2005 | Paquette |
| 2002/0158902 A1 | 10/2002 | Hooker et al. | 2005/0168476 A1 | 8/2005 | Levene et al. |
| 2002/0171682 A1 | 11/2002 | Frank et al. | 2005/0172239 A1 | 8/2005 | Liu et al. |
| 2002/0174003 A1 | 11/2002 | Redmann et al. | 2005/0183026 A1 | 8/2005 | Amano et al. |
| 2002/0174055 A1 | 11/2002 | Dick et al. | 2005/0193368 A1 | 9/2005 | Becker et al. |
| 2002/0174181 A1 | 11/2002 | Wei | 2005/0198584 A1 | 9/2005 | Matthews et al. |
| 2002/0180798 A1 | 12/2002 | Poor et al. | 2005/0215310 A1 | 9/2005 | Boyd et al. |
| 2002/0186257 A1 | 12/2002 | Cadiz et al. | 2005/0221808 A1 | 10/2005 | Karlsson et al. |
| 2002/0196268 A1 | 12/2002 | Wolff et al. | 2005/0240857 A1 | 10/2005 | Benedict et al. |
| 2003/0008661 A1 | 1/2003 | Joyce et al. | 2005/0243373 A1 | 11/2005 | Silverbrook et al. |
| 2003/0008711 A1 | 1/2003 | Corbo | 2005/0256940 A1 | 11/2005 | Henderson et al. |
| 2003/0009267 A1 | 1/2003 | Dunsky et al. | 2005/0278651 A1 | 12/2005 | Coe et al. |

| | | |
|---|---|---|
| 2005/0282612 A1 | 12/2005 | Mathews |
| 2005/0283734 A1 | 12/2005 | Santoro et al. |
| 2006/0001652 A1 | 1/2006 | Chiu et al. |
| 2006/0004913 A1 | 1/2006 | Chong |
| 2006/0005207 A1 | 1/2006 | Louch et al. |
| 2006/0010394 A1* | 1/2006 | Chaudhri et al. ............. 715/779 |
| 2006/0015818 A1 | 1/2006 | Chaudhri et al. |
| 2006/0015846 A1 | 1/2006 | Fraleigh et al. |
| 2006/0031264 A1 | 2/2006 | Bosworth et al. |
| 2006/0036703 A1 | 2/2006 | Fulmer et al. |
| 2006/0036941 A1 | 2/2006 | Neil |
| 2006/0036969 A1 | 2/2006 | Guido et al. |
| 2006/0053384 A1 | 3/2006 | La Fetra et al. |
| 2006/0064422 A1 | 3/2006 | Arthurs et al. |
| 2006/0075033 A1 | 4/2006 | Bienstock et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0095331 A1 | 5/2006 | O'Malley et al. |
| 2006/0107231 A1 | 5/2006 | Matthews et al. |
| 2006/0112123 A1 | 5/2006 | Clark et al. |
| 2006/0123356 A1 | 6/2006 | Sobeski et al. |
| 2006/0123359 A1 | 6/2006 | Schatzberger et al. |
| 2006/0136843 A1 | 6/2006 | Shafron |
| 2006/0150118 A1 | 7/2006 | Chaudhri et al. |
| 2006/0156248 A1 | 7/2006 | Chaudhri et al. |
| 2006/0168536 A1 | 7/2006 | Portmann |
| 2006/0168538 A1 | 7/2006 | Stevens et al. |
| 2006/0174202 A1 | 8/2006 | Bonner |
| 2006/0197752 A1 | 9/2006 | Hurst et al. |
| 2006/0200775 A1* | 9/2006 | Behr et al. ................... 715/767 |
| 2006/0206835 A1 | 9/2006 | Chaudhri et al. |
| 2006/0230059 A1 | 10/2006 | Etgen et al. |
| 2006/0230272 A1 | 10/2006 | Lawrence et al. |
| 2006/0236257 A1 | 10/2006 | Othmer et al. |
| 2006/0253794 A1 | 11/2006 | Wilson |
| 2006/0271637 A1 | 11/2006 | McKeon et al. |
| 2006/0274086 A1 | 12/2006 | Forstall et al. |
| 2006/0277469 A1 | 12/2006 | Chaudhri et al. |
| 2006/0277481 A1 | 12/2006 | Forstall et al. |
| 2007/0011026 A1 | 1/2007 | Higgins et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0074126 A1* | 3/2007 | Fisher et al. ................. 715/764 |
| 2007/0101146 A1 | 5/2007 | Louch et al. |
| 2007/0101279 A1 | 5/2007 | Chaudhri et al. |
| 2007/0101291 A1 | 5/2007 | Forstall |
| 2007/0101297 A1 | 5/2007 | Forstall et al. |
| 2007/0101433 A1 | 5/2007 | Forstall et al. |
| 2007/0112739 A1 | 5/2007 | Burns et al. |
| 2007/0118813 A1 | 5/2007 | Forstall et al. |
| 2007/0129888 A1 | 6/2007 | Rosenberg |
| 2007/0130541 A1 | 6/2007 | Louch et al. |
| 2007/0162850 A1 | 7/2007 | Adler et al. |
| 2007/0203984 A2 | 8/2007 | AlHusseini et al. |
| 2007/0209013 A1 | 9/2007 | Ramsey et al. |
| 2007/0266093 A1 | 11/2007 | Forstall et al. |
| 2007/0273558 A1 | 11/2007 | Smith et al. |
| 2008/0016468 A1 | 1/2008 | Chambers et al. |
| 2008/0034309 A1 | 2/2008 | Louch et al. |
| 2008/0034314 A1 | 2/2008 | Louch et al. |
| 2008/0155453 A1 | 6/2008 | Othmer |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2009/0005071 A1 | 1/2009 | Forstall et al. |
| 2009/0021486 A1 | 1/2009 | Chaudhri et al. |
| 2009/0024944 A1 | 1/2009 | Louch et al. |
| 2009/0044138 A1 | 2/2009 | Rudolph et al. |
| 2009/0125815 A1 | 5/2009 | Chaudhri et al. |
| 2009/0144644 A1 | 6/2009 | Chaudhri et al. |
| 2009/0158193 A1 | 6/2009 | Chaudhri et al. |
| 2009/0187841 A1 | 7/2009 | Chaudhri et al. |
| 2009/0228824 A1 | 9/2009 | Forstall et al. |
| 2009/0260022 A1 | 10/2009 | Louch et al. |
| 2009/0271724 A1 | 10/2009 | Chaudhri et al. |

FOREIGN PATENT DOCUMENTS

| | | |
|---|---|---|
| EP | 0694879 | 1/1996 |
| EP | 0 908 835 | 4/1999 |
| EP | 1383080 | 1/2004 |
| EP | 0972273 | 3/2004 |
| EP | 1 724 996 | 11/2006 |
| ER | 1 237 076 | 9/2002 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 02/09039 | 1/2002 |
| WO | WO 03/023593 | 3/2003 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2006/0119269 | 11/2006 |

OTHER PUBLICATIONS

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.

Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html140/struct/objects.html, 21 pages.

Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.

Conner Borookshire D. et al. "Three-Dimensional Widgets" ACM 1992, 8 pages.

Fried, Ina, "Developer Calls Apple's Tiger a Copycat," CNET News.com, June 28, 2004 [online] Retrieved on Jul. 1, 2004] Retrieved from the Internet URL:http://zdnet.com.com/2102-1104_2-250692.html?tag=printthis, 2 pages.

Fried, Ina, "For Apple's Tiger, the Keyword is Search", CNET News.com, Jun. 28, 2004 [online] Retrieved on Jul. 1, 2004] Retrieved from the Internet URL:http://zdnet.com.com/2102-1103_2-5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Http://en.wikipedia.org/wiki/Comparison_of_widget_engines, 2007, 6 pages.

http://en.wikipedia.org/wiki/Windows-Sidebar, 2007, 7 pages.

http://www.nat.org/dashboard/blog.php3_Dec._2003, 31 pages.

International Search Report , PCT/US2005/008804, Jul. 27, 2005, 3 pages.

International Search Report and Writen Opinion, PCT/US2005/022152, Jul. 10, 2006, 8 pages.

International Search report, PCT/US2005/008805, Aug. 8, 2005, 3 pages.

Konfabulator, "Cupertino, Start your Photocopiers!," [online] [Retrieved on Jul. 1, 2004] Retrieved from the Internet <URL: http://www.konfabulator.com>, 1 page.

Konfabulator, "Konfabulator & Widget Basics," [online] [Retrieved on Jul. 1, 2004] Retrieved from the Internet <URL: http://www.konfabulator.com/info/basics.html>, 3 pages.

Konfabulator, "Screenshots," [online] [Retrieved on Jul. 1, 2004] Retrieved from the Internet <URL: http://www.konfabulator.com/info/screenshots.html>, 2 pages.

Konfabulator, "What is Konfabulator?," [online] [Retrieved on Jul. 1, 2004] Retrieved from the Internet <URL: http://www.konfabulator.com/info/, 3 pages.

Lammers, J.., et al., "Maya 4.5 Fundamentals: Particles," New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.

Notification of Transmittal of the International Search Report and the Written Opinion of the International Searching Authority, PCT/US2005/022579, 15 pages.

Nvidia, "CG—Teaching Cg," Power Point Presentation, Author and date unknown, pp. 1-16.

Puder, A., "Extending Desktop Applications to the Web," ACM International Conference Proceedings Series, Proceedings of the Jun. 2004 International Symposium on Information and Communication Technologies, 2004, vol. 90, 6 pages.

Segal, Mark and Akeley, Kurt, "The OpenGL Graphics System: A Specification (Version 1.5)," Copyright 1992-2003 Silicon Graphics, Inc., Oct. 30, 2003, 334 pages.

Shantzis, Michael A., "A Model for Efficient and Flexible Image Computing," Computer Graphics Proceedings, Annual Conference Series, Orlando, Florida, Jul. 24-29, 1994, pp. 147-154.

Shiozawa, Hidekazu et al., "Perspective Layered Visualization of Collaborative Workspaces," Proceedings of the International ACM SIGGROUP conference on Supporting Group Work Publisher, Nov. 1999, 5 pages.

Snippet Software Inc. et al. "Corporate Portal Newsletter" Oct. 2000, 3 pages.

Snippet Software Inc. et al. "Snippets Software" Jun. 2001, 16 pages.

Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3_Dec._2003, 8 pages.

Stardock.com et al. "DesktopX Whitepaper and users Guide" 1999, 72 pages.

Tang, J.C. et al., "ConNexus to Awarenex: Extending Awareness to Mobile Users," SIGCHI '01, AMC, Mar. 31-Apr. 4, 2001, 8 pages.

Ullenboom, C., "Java is auch eine Insel," 2003, [online] [Retrieved on Apr. 13, 2006] Retrieved from the Internet URL: http://www.galileocomputing.de/openbook/javainsel2//java_140000.htm#Xxx998138, 3 pages.

Van Gelder, Allen, and Kwansik, Kim, "Direct Volume Rendering with Shading via Three-Dimensional Textures," Computer Science Dept., Univ. of California, Santa Cruz, CA 95064, 9 pages.

Wardell, Brad, Konfabulator for Windows, Jan. 10, 2004; [online] Retrieved from the Internet Mar. 6, 2005] Retrieved from the Internet: URL: http://www.xpthemes.com/forums.asp?MID=19&CMID=19&AID=4472, 6 pages.

"About Merkitys"; [online] [Retrieved on Feb. 4, 2008]; Retrieved from the Internet, URL: http://meaning.3xi.org/; 3 pages.

"Advanced Digital Photo Solutions"; GeoSpatial Experts; [online] [Retrieved on Feb. 4, 2008]; Retrieved from the Internet, URL: http://www.geospatialexperts.com/productadv.html; 4 pages.

"Comparison of widget engines", [online] Retrieved from the Internet, URL: http://en.wikipedia.org/wiki/Comparison_of_widget_engines, 2007; 4 pages.

"Coolsmartphone"; Apr. 17, 2006, [online] [Retrieved on Sep. 11, 2009]; Retrieved from the Internet, URL: http://www.web.archive.org/web/20060417080115/http://www.coolsmartphone.com/article569.html ; 24 pages.

"Dashboard Blog", Dec. 11, 2003, [online] [Retrieved from the Internet on May 11, 2007], URL: http://www.nat.org/dashboard/blog.php3, 31 pages.

"Desktop Sidebar", [online] [Retrieved on May 11, 2007] Retrieved from the Internet URL: http://web.archive.org/web/20040101160831/http://www.desktopsidebar.comi; 5 pages.

"Garmin hits iphone directly with nuvifone"; [online] [Retrieved on Mar. 17, 2008]; Retrieved from the Internet, URL: http://www.electronista.com/print/50764; 3 pages.

Garmin® nüvifone™ Images, [online] [Retrieved from the Internet on Feb. 4, 2008], URL: http://www8.garmin.com/buzz/nuvifone/media_gallery.jsp; 2 pages.

"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.

"Go View Map Save to Favorites Cancel"; [online] [Retrieved on Feb. 4, 2008]; Retrieved from the Internet, URL: http://www8.garmin.com/buzz/nuvifone/m/g/sc-geotag-lg.jpg; 1 page.

"GPS Blogging Phones"; [online] [Retrieved on Apr. 5, 2006], Retrieved from the Internet at URL: http://www.dailywireless.org/modules.php?name=News&file=article&sid=4613; 3 pages.

"International Roaming Guide—Personal Experience(s) from Customer and Community Member"; [online] [Retrieved on Jun. 26, 2006], Retrieved from the Internet, URL: http://forums.cingular.com/cng/board/message?board.id=international&message.id=1185; 6 pages.

"Inter-widget communication?", [online] [Retrieved on Jun. 5, 2009], Retrieved from the Internet URL: http://www2.konfabulator.com/forums/lofiversion/index.php/t125.html; 3 pages.

"MOREnet Dialing Plan: PSTN and IP Network Integration for H.323, H320 VoIP and Public Voice Networks", [online] [Retrieved on Jan. 11, 2008] Retrieved from the Internet, URL: http://www.more.net/technical/research/dialplan/index.html; 12 pages.

"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.

"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.

"Portlet-to-portlet communication between JSR 168 portlets on public pages", Apr. 5, 2006, [online]; Retrieved from the Internet URL: http://www.ibm.developerworks/websphere/library/techarticles/0604_scott/0604_scott.html; 9 pages.

"SNAP, MAP and SHARE Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.

"Starfish Software Introduces Starfish Internet Sidekick; Starfish Internet Sidekick is the best way for Internet users to manage their calendar, contacts and communications," Business Wire, Sep. 23, 1996, [online] [Retrieved on Dec. 8, 2008]; Retrieved from the Internet URL: http://findarticles.com/articles/mi_mOEIN/is_1996_Sept_23/ai_18704672?tag=rel.resl; 2 pages.

"Welcome to the Gigaplex!™", Lazar Productions, Nov. 1996, [online] [Retrieved on Dec. 8, 2008]; Retrieved from the Internet URL: http://web.archive.org/web/19961105081827/www.gigaplex.com/; 4 pages.

"Windows Sidebar", Wikipedia [online] [Retrieved on May 11, 2007] Retrieved from the Internet, URL:http://en.wikipedia.org/wiki/Windows-Sidebar, 2007, 2 pages.

"Convert just about Anything to Anything else", Online Conversion.com, [online] [Retrieved on Jun. 22, 2008]; Retrieved from the Internet, URL: http://web.archive.org/web/20000815055422/http://www.onlineconversion.com/; 2 pages.

"Objects, Images and Applets," [online] [Archived by http://archivve.org; Retrieved on Apr. 13, 2006], Retrieved from the Internet URL: http://web.archivve.org/web/20030210154019/http://www.w3.org/TR/REC-html140/struct/objects.html; 21 pages.

"Writing a Desk Accessory," Developer Connection, Apple Computer, Inc., Jul. 3, 1996, [online] [Retrieved on May 11, 2009] Retrieved from the Internet URL: http://developer.apple.com/documentation/mac/devices/devices-16.html, 4 pages.

Akeley et al., "Real-Time Graphics Architecture," http://www.grahics.stanford.edu/courses/cs448a-01-fall, the OpenGL® Graphics System, CS448 Lecture 15, Fall, 2001, pp. 1-20.

Akeley, "Cg—Teaching Cg," Power Point Presentation, NVIDIA Corporation, 2002, 16 pages.

Altman, "Visual QuickStart Guide PowerPoint 2000/98, Applying Preset Animations", ProQuest Safari Books, Peachpit Press, May 7, 1999, [online] Retrieved from the Internet: URL: http://proquest.safaribooksonline.com/0201354411; 7 pages.

BabelFish.com, Inc., Oct. 2003, [online] [Retrieved on Dec. 8, 2008]; Retrieved from the Internet URL: http://web.archive.org/web/20031002115902/www.babelfish.com/en/index.html; 1 page.

Baratz et al., "DesktopX 3/1", Ars Technica, Nov. 17, 2005, [online] [Retrieved on Aug. 1, 2008]; Retrieved from the Internet URL: http://arstechnica.com/reviews/apps/desktopx/ars; 4 pages.

Beier et al., "The Bull's-Eye: A Framework for Web Application User Interface Design Guidelines", Proceedings of the Sigchi Conference on Human Factors in Computing Systems, Apr. 2003, pp. 489-496.

Cadiz et al., "Slideshow: Providing Peripheral Awareness of Important Information," Technical Report MSR-TR-2001-83, Microsoft Corporation, Redmond, WA; Sep. 14, 2001; 9 pages.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE, vol. 2, Oct. 12-15, 2003, pp. 975-978.

Chinese Notification of First Office Action, Chinese Patent Appliation No. 200580016349.3, Jul. 25, 2008, 21 pages.

Conner et al. "Three-Dimensional Widgets" ACM 1992, pp. 183-188 and 230-231.

Elliott, Conal, "Programming Graphics Processors Functionally," Proceedings of the 2004 Haskell Workshop, Sep. 22, 2004. 11 pages.

Fried, Ina, "Developer Calls Apple's Tiger a copycat," CNET News.com, Jun. 28, 2004 [online] Retrieved on May 6, 2009], Retrieved from the Internet URL: http://news.cnet.com2100-1045_3-5250692.html; 2 pages.

Fried, Ina, "For Apple's Tiger, the kyword is search", CNET News.com, Jun. 28, 2004, [online] [Retrieved on May 5, 2009], Retrieved from the Internet URL: http://archive.org/web20040823135016/http://zdnet.com-com/2102-1103_2-5250346.html; 2 pages.

Gruber et al., "Dashboard vs. Konfabulator", Jun. 2004; 10 pages.

Haeberli et al., "The Accumulation Buffer: Hardware Support for High-Quality Rendering," Computer Graphics, Aug. 1990, 24(4):309-318.

Han, "Bi-manual, multi-point, and multi-user interactions on a graphical interaction surface", Multi-Touch Interaction Research; [online] [Retrieved on Apr. 13, 2006]; Retrieved from the Internet, URL: http://mrl.nyu.edu/~jhan/ftirtouch/; 4 pages.

Helal et al., "Drishti: An Integrated Navigation System for Visually Impaired and Disabled", Fifth International Symposium on Wearable Computers (ISWC'01), IEEE, 2001, pp. 149-156.

International Search Report and the Written Opinion, dated Jan. 27, 2006, issued in International Application No. PCT/US2005/022579; 15 pages.

International Search Report and the Written Opinion, dated May 8, 2008, issued in International Application PCT/US2007/077441; 17 pages.

International Search Report, dated Aug. 8, 2005, issued in International Application PCT/US2005/008805; 3 pages.

International Search Report, dated Jul. 10, 2006, issued in International Application PCT/US2005/022152; 1 page.

International Search Report, dated Jul. 27, 2005, issued in International Application PCT/US2005/008804; 3 pages.

Invitation to Pay Additional Fees and Communication Relating to the Results of the Partial International Search, dated Jan. 28, 2008, issued in International Application PCT/US2007/077441; 8 pages.

Invitation to Pay Additional Fees and Communication Relating to the Results of the Partial International Search, dated Jul. 29, 2008, issued in International Application PCT/US2008/050295; 10 pages.

Invitation to Pay Additional Fees and Communication Relating to the Results of the Partial International Search, dated May 15, 2009, issued in Interntional Application No. PCT/US2008/050047; 11 pages.

International Search Report and Written Opinion, dated Sep. 3, 2009, issued in Interntional Application No. PCT/US2008/050047; 17 pages.

Invitation to Pay Additional Fees and Communication Relating to the Results of the Partial International Search, dated May 8, 2009, issued in International Application PCT/US2008/050038; 19 pages.

JavaBoutique, [online], Retrieved from the Internet URL: http://javaboutique.internet.com/utilities/counter.html; Oct. 1, 2002; 2 pages.

Konfabulator, "Cupertino, Start your Photocopiers!," [online] [Retrieved on Jul. 1, 2004]; Retrieved from the Internet URL: http://www.konfabulator.com, 1 page.

Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.

Konfabulator, "Konfabulator & Widget Basics", [online] [Retrieved on Jul. 1, 2004]; Retrieved from the Internet URL: http://www.konfabulator.com/info/basics.html, 3 pages.

Konfabulator, "Screenshots," [online] [Retrieved on Jul. 1, 2004]; Retrieved from the Internet URL: http://www.konfabulator.com/info/screenshots.html, 2 pages.

Konfabulator, "What is Konfabulator?," [online] [Retrieved on Jul. 1, 2004]; Retrieved from the Internet URL: http://www.konfabulator.com/info/; 3 pages.

Lammers et al., "Maya 4.5 Fundamentals: Particles", New Riders Publishing, Jan. 14, 2003, [online] [Retrieved on Feb. 17, 2007] Retrieved from the Internet URL: http://proquest.safaribooksonline.com/0735713278; 12 pages.

Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.

Microsoft Corporation, "User's Guide Microsoft® Windows™ and MS-DOS® 6", 1993, pp. Cover-xvi, 112-121.

Movies.com, Jan. 2002, [online] [Retrieved on Dec. 8, 2008]; Retrieved from the Internet URL: http://www.archive.org/web/20020118102516/movies.go.com; 1 page.

Pruder, A., "Extending Desktop Applications to the Web," ACM International Conference Proceedings Series, Proceedings of the Jun. 2004 International Symposium on Information and Communication Technologies, 2004, vol. 90, 6 pages.

Rist et al., "Customizing Graphics for Tiny Displays of Mobile Devices", Personal and Ubiquitous Computing, 2002, vol. 6, pp. 260-268.

Rochkind, M. et al., "Common Elements in Today's Graphical User Interfaces: The Good, the Bad, and the Ugly," Interchi '93, AMC, Apr. 24-29, 1993, pp. 470-473.

Segal et al., "The OpenGL® Graphics System: A Specification (Version 1.5)", © 1992-2003 Silicon Graphics, Inc., Oct. 30, 2003, 333 pages.

Shantzis, "A Model for Efficient and Flexible Image Computing," Computer Graphics Proceedings, Annual Conference Series, Orlando, Florida, Jul. 24-29, 1994, pp. 147-154.

Shiozawa et al., "Perspective Layered Visualization of Collaborative Workspaces," Proceedings of the International ACM SIGGROUP conference on Supporting Group Work Publisher, Nov. 1999, 10 pages.

Siracusa, "Mac OS X 10.4 Tiger: Dashboard", Apr. 28, 2005, [online] [Retrieved on Aug. 1, 2008] Retrieved from the Internet URL: http://arstechnica.com/reviews/os/macosx-10-4.ars/17; 7 pages.

Snippet Software, "Product Spotlight Non-browser based portal solution from Snippets Software", Corporate Portal Newsletter, Oct. 2000, vol. 1, No. 10, 3 pages.

Snippet Software, "Snippets Infomration Delivery Platform", [online] [Retrieved on Jun. 11, 2001]; Retrieved from the Intrnet URL: http://www.snippets.com/products/; 16 pages.

Snippets Software, "Products Overview", Feb. 2002, [online] [Retrieved on Feb. 5, 2008] Retrieved from the Internet URL: http://web.archive.org/web/20020206061508/http://www.snippets.com/products/; 2 pages.

Staples, "Representation in Virtual Space: Visual Convention in the Graphical User Interface," Proceedings of the SIGCHI Conference on Human Factors in Computing Systems, Apr. 1993 [online] [Retrieved on Dec. 2003] Retrieved from the Internet URL: http://www.nat.org/dashboard/blog.php3 Dec. 2003; 8 pages.

Stardock, "Gallactica Civilization: Dread Lords—User Manual", Stardock Entertainment© 2006; 65 pages.

Stardock, "Your Edge in Software", [online] [Retrieved on May 11, 2007]; Retrieved from the Internet URL: http://www.stardock.com/media.asp?cmd=mediakits; 56 pages.

Stardock, "DesktopX General Guide," Aug. 2000, [online] [Retrieved on Jan. 31, 2008]; Retrieved from the Internet URL:http://www.stardock.com/products/desktopx/docs/; 28 pages.

Stardock, "DesktopX Tutorial", Aug. 2000, [online] [Retrieved on Jan. 31, 2008]; Retrieved from the Internet URL:http://www.stardock.com/products/desktopx/tutorial.html; 40 pages.

Stardock, "DesktopX WhitePaper", Aug. 2000, [online] [Retrieved on Jan. 31, 2008]; Retrieved from the Internet URL: http://www.stardock.net/media/whitepaper_desktopx.html; 15 pages.

Stardock, "The User Guide—Version 2", DesktopX 2000; 57 pages.

Stardock, "What Can It Do? Making Objects", DesktopX Tutorial, 2001, [online] [Retrieved on Apr. 11, 2008]; Retrieved from the Internet URL: http://web.archive.org/web/20011019222825/http://www.stardock.com/products/desktopx/ . . . ; 6 pages.

Tang et al., "ConNex to Awarenex: Extending Awareness to Mobile Users," SIGCHI '01, AMC, Mar. 31-Apr. 4, 2001, 8 pages.

Thomas et al., "Animating Widgets in the InterViews Toolkit", Lecture Notes in Computer Science, pp. 26-44, 1995.

Ullenboom, "Java is auch eine Insel," 2003, [online] [Retrieved on Apr. 13, 2006]; Retrieved from the Internet URL: http://www.galileocomputing.de/openbook/javainsel2//java_140000.htm#Xxx998138, 3 pages.

Van Gelder et al., "Direct Volume Rendering with Shading via Three-Dimensional Textures," Computer Science Dept., Univ. of California, Santa Cruz, CA 95064, Jul. 19, 1996; 17 pages.

VMware™, "VMware™ Workstation User's Manual, Version 3.2", 2002; cover, pp. 12-13.

Wardell, "Apple's Dashboard vs. Konfabulator vs. DesktopX", Skinning the frog, Jul. 1, 2004, [online] [Retrieved on Aug. 1, 2008]; Retrieved from the Internet URL: http://frogboy.joeuser.com/article/19800; 9 pages.

Wardell, "Konfabulator for Windows", Jan. 10, 2004, [online] [Retrieved on Mar. 6, 2006]; Retrieved from the Internet URL: http://www.xpthemes.com/forums.aps?MID=19&CMID=19&AID=4472, 6 pages.

International Search Report and Written Opinion, dated Oct. 16, 2009, issued in International Application No. PCT/US2008/070217.

Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.

"Sidekick", [Online] [Retrieved on Oct. 12, 2009] Retrieved from the Internet at URL: http://en.widipedia.org/wiki/Sidekick; 5 pages.

Javaboutique. Oct. 8, 2008. Available at: http://web.archive.org/web/20021208051951/http://javaboutique.internet.com/utilities/counter.html.

Rodriguez et al., "IBM WebSphere Portal V5 A Guide for Portlet Application Development," Feb. 1, 2004, 48 pages.

Inter-Widget Messaging!, I want my widgets to work together!, Feb. 7, 2005, 4 pages.

Widget to widget communication, Jun. 29, 2006, 2 pages.

Widgets 1.0, Nov. 9, 2006, 13 pages.

eHow, VMWare, http://www.ehow.com/how_6368_minimize-window.html, "How to Minimize a Window," Jun. 2004.

Grundy, "An environment for developing adaptive, multi-device user interfaces," AUIC '03 Proceedings of the Fourth Australasian User Interface Conference on User Interfaces, 2003, vol. 18, Australian Computer Society, Inc., Darlinghurst, Australia.

Warren, "The VMware Workstation 5 Handbook," Jun. 2005, *Course Technology PTR*, 50 pages.

Bauer, "Transparent User Modeling for a Mobile Personal Assistant," LWA 2004: Lernen-Wissensentdecking-Adaptivitat, [Online] Oct. 6, 2004, pp. 3-8, Berlin Retrieved from the Internet: URL:http://www.dfki.de/specter/Docs/Bauer04.pdf> [retrieved on Sep. 15, 2009], TellWidget, Sep. 5, 2005, 3 pages.

Lieberman and Selker, "Agents for the User Interface," Handbook of Agent Technology, 2003, pp. 1-21, Retrieved from the Internet, URL: http://web.media.mit.edu/{lieber/Publications/Agents_for_UI.pdf> [retrieved on Sep. 15, 2009].

Bauer and Deru, "Motion-Based Adaptation of Information Services for Mobile Users," Lecture Notes in Computer Science, Aug. 19, 2005, Retrieved from the Internet, URL: http://www.springerlink.com/content/lwdvxw9ervxa44f9/fulltext.pdf>, [retrieved on Sep. 15, 2009], 6 pages.

\* cited by examiner

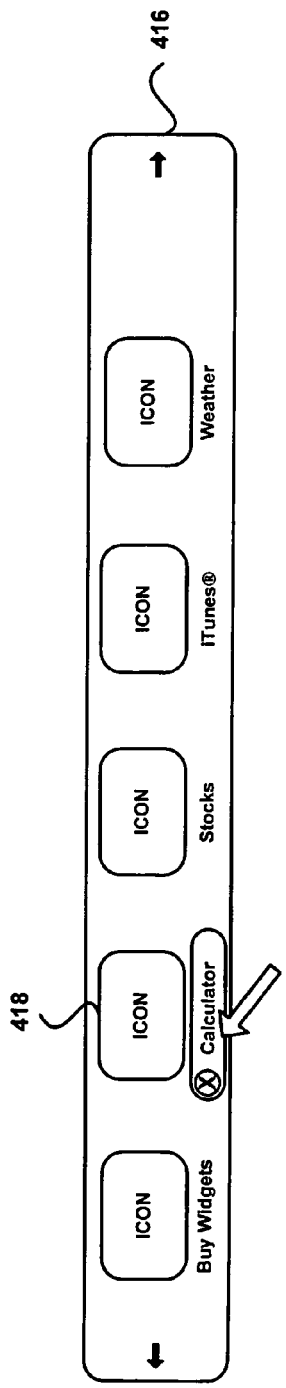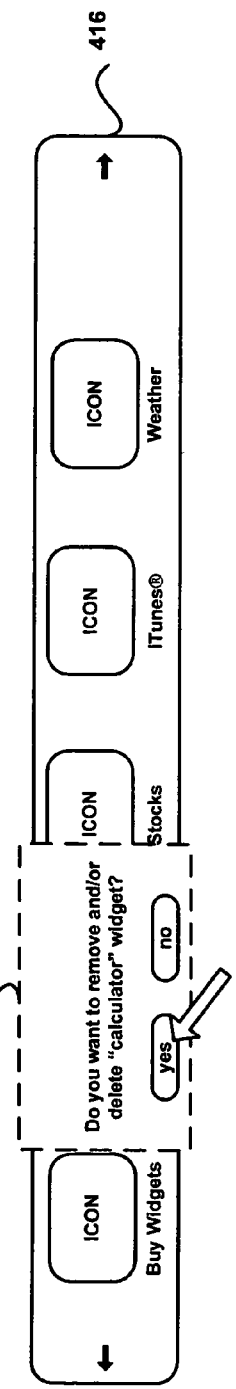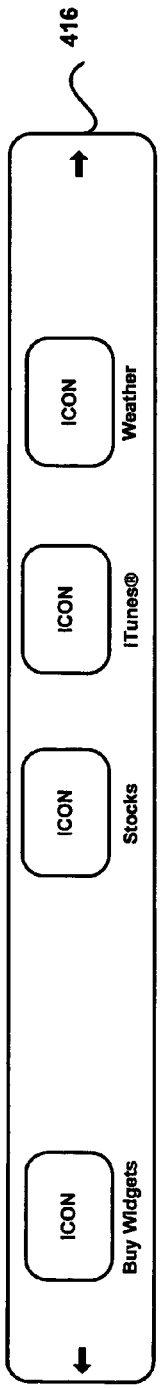

PREVIEW INCLUDING THEME BASED INSTALLATION OF USER INTERFACE ELEMENTS IN A DISPLAY ENVIRONMENT

RELATED APPLICATIONS

This application is a continuation-in-part of U.S. Patent application Ser. No. 11/148,010, filed. Jun. 7, 2005, entitled "Preview and Installation of User Interface Elements in a Display Environment". The disclosure of the prior application is considered part of and is incorporated by reference in the disclosure of this application.

This application claims the benefit of priority of U.S. Provisional Patent Application No. 60/734,016, entitled "Preview Including Theme Based Installation of User Interface Elements In A Display Environment," filed Nov. 4, 2005, which provisional patent application is incorporated herein by reference in its entirety.

This application claims the benefit of priority of U.S. Provisional Patent Application No. 60/730,956, filed Oct. 27, 2005, entitled "Widget Security," which provisional patent application is incorporated herein by reference in its entirety.

This application is generally related to the following jointly owed and co-pending patent applications, each incorporated herein by reference in its entirety:

- U.S. Provisional Patent Application No. 60/583,125, for "Procedurally Expressing Graphic Objects for Web Pages," filed Jun. 25, 2004;
- U.S. patent application Ser. No. 10/874,829, for "User Interface for Assisting in the Installation of an Asset," filed Jun. 22, 2004;
- U.S. patent application Ser. No. 11/145,561, for "Application Clipper," filed Jun. 3, 2005;
- U.S. patent application Ser. No. 11/145,560, for "Web View Applications," filed Jun. 3, 2005; and
- U.S. patent application Ser. No. 11/145,023, for "Clip View Applications," filed Jun. 3, 2005.

TECHNICAL FIELD

The disclosed implementations relate generally to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools (e.g., applications) that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed and accessed through a user interface, such as a "dashboard layer," which is also referred to as a "dashboard." Widgets and dashboards are described in co-pending U.S. patent application Ser. No. 10/877,968, entitled "Unified Interest Layer For User Interface."

Due to the large number of widgets available to a user, a virtual desktop or dashboard can become cluttered and disorganized, making it difficult for the user to quickly locate and access a widget. Moreover, many widgets may not perform as expected or advertised when installed. Some widgets may even present a security risk to the host machine and network resources because they include a virus or are designed to carry out malicious activities.

SUMMARY

In one implementation, a user-activated dashboard layer (also referred to as a "unified interest layer" or "dashboard") is provided that includes a designated or dynamic installation area (also referred herein as "a carpet") for use when installing user interface elements in the dashboard layer. The dashboard layer can contain any number of user interface elements, referred to herein as "widgets," for quick access by a user. In response to a command from a user, the dashboard layer is invoked and the widgets are shown on the screen. In one aspect, the user can install a widget in the dashboard layer, such installation providing a presentation of the widget in a designated installation area of the dashboard layer. The parameters of the designated installation area can be controlled to allow for secure and managed installation of widgets in the dashboard environment. In one implementation, widgets are previewed in the designated installation area prior to activation in the dashboard layer. In one implementation, widgets installed in the designated installation area are fully functional, but are controlled to limit resources or access so as to limit or inhibit rogue behavior. Though, reference is made to installation in a dashboard environment, the carpet and functional equivalents can be used in other display environments.

Widgets can be of any type. They can communicate with a remote server to provide information to the user (e.g., a weather report), or they can provide commonly needed functionality (e.g., a calculator), or they can act as an information repository (e.g., a notepad or calendar). Some widgets can provide a combination of these types of functions.

In one aspect a method is provided for installing a widget in a dashboard. The method includes receiving a selection of a widget to be displayed in a dashboard of a user interface and selectively displaying the widget in a designated installation area of the dashboard. The displaying can include sizing the designated installation area to accommodate the widget, and in one aspect, to include a fringe area that extends beyond an area (the presentation window) associated with the installed widget. In one implementation, a preview designator is provided in lieu or addition to the fringe area. In some implementations, the installed widget is presented in a preview environment prior to installing the widget in the display environment. Selectively displaying the widget includes determining if a preview is required, instantiating the widget in a preview environment including displaying the widget in a presentation window in the designated installation area and supporting interaction of the widget with a user and other resources.

Aspects of the invention can include one or more of the following features. The user interface element can be a widget. The display environment can be a dashboard. The preview environment can be different than the display environment in which the user interface element it eventually displayed.

BRIEF DESCRIPTION OF THE DRAWINGS

FIGS. 4g-4i illustrate the deletion of widgets from a configuration bar.

DETAILED DESCRIPTION

Hardware Architecture

Figure 1:
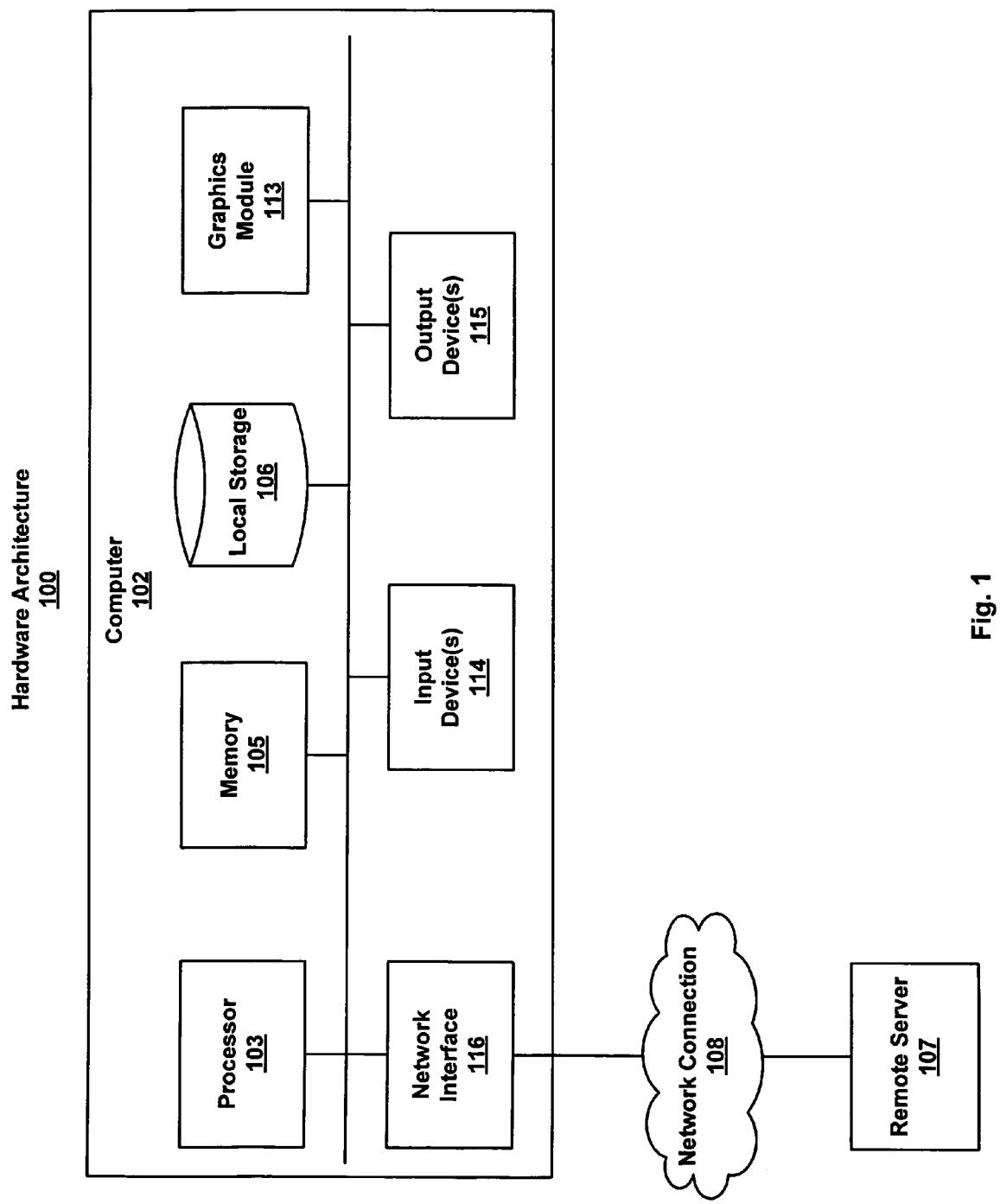
FIG. 1 is a block diagram of a hardware architecture for previewing, installing, managing and operating widgets in a display environment.

FIG. 1 is a block diagram of a hardware architecture 100 for previewing, installing, managing and operating widgets in a dashboard. The architecture 100 includes a personal computer 102 coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user 101 interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While dashboards and widgets are described herein with respect to a personal computer 102, it should be apparent that the disclosed implementations can be incorporated in, or integrated with, any electronic device that is capable of using widgets, including without limitation, portable and desktop computers, servers, electronics, media players, game devices, mobile phones, email devices, personal digital assistants (PDAs), embedded devices, televisions, etc.

A system and method for previewing, installing, managing and operating widgets and dashboards can be implemented as one or more plug-ins that are installed and run on the personal computer 102. The plug-ins are configured to interact with an operating system (e.g., MAC OS® X, WINDOWS XP, LINUX, etc.) and to perform the various dashboard and widget functions, as described with respect of FIGS. 2-6. A system and method for previewing, installing, managing and operating widgets and dashboards can also be implemented as one or more software applications running on the computer 102. Such a system and method can be another widget that is configurable to communicate with other widgets, applications and/or operating systems. Such a system and method can also be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.).

For illustrative purposes, in the following description the invention is described as a feature of an operating system 305 (FIG. 3) for use in installing widgets in a dashboard environment; however, one skilled in the art will recognize that the techniques of the present invention can be implemented in other contexts as well, including those described above, to install other elements, and in other environments including environments associated with applications or operating systems. Examples of other environments include e-mail environments, desktop environments, application environments, hand-held display environments, and other display environments.

Dashboard Overview

Figure 2:
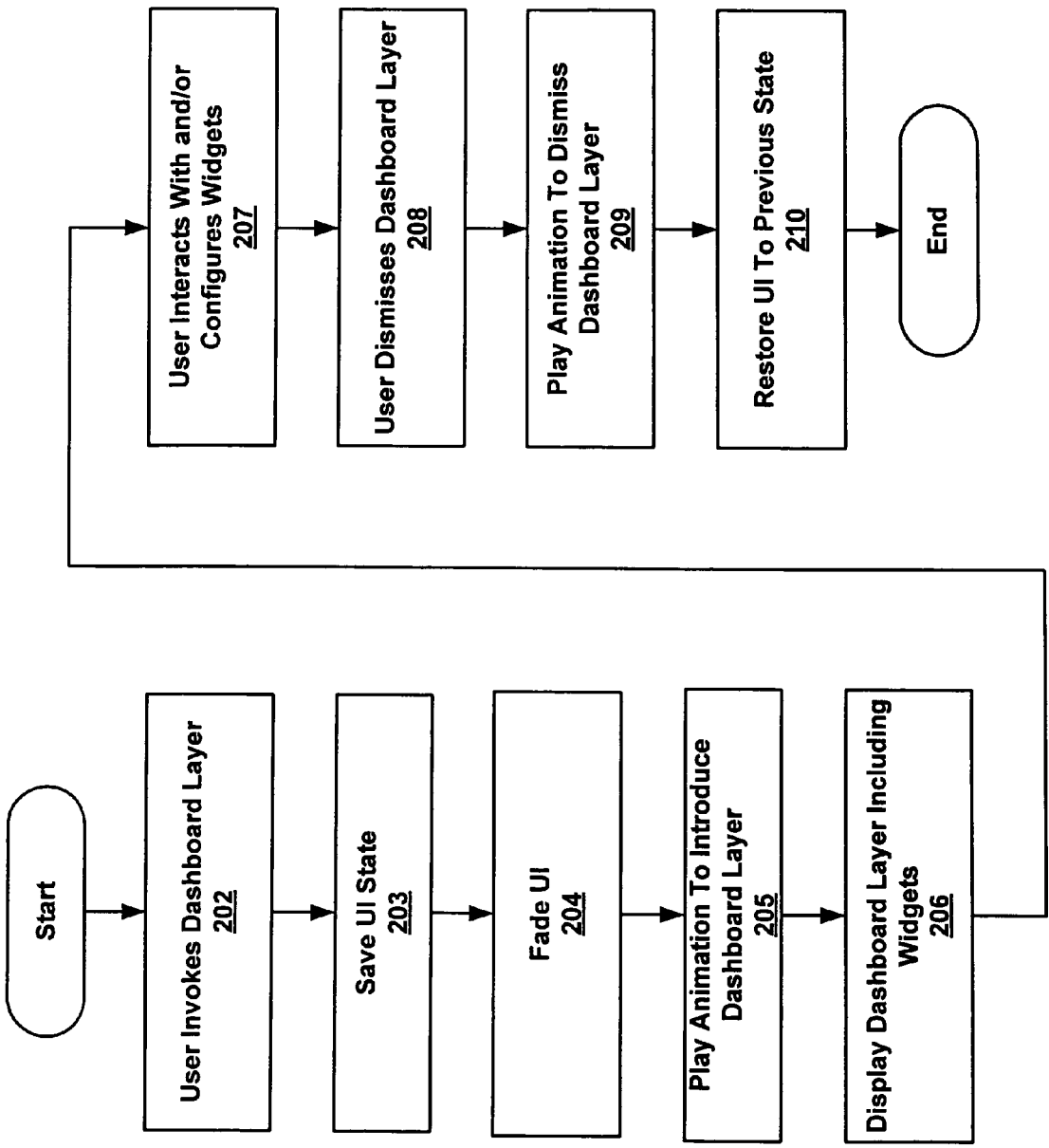
FIG. 2 is a flow diagram of a process for activating and using a dashboard.

FIG. 2 is a flow diagram of an implementation of a process for activating and using a dashboard. A dashboard layer (also referred to herein as a "unified interest layer" or "dashboard") is used to manage and display widgets. A user can invoke a dashboard (202) by hitting a designated function key or key combination, or by clicking on an icon, or by selecting a command from an onscreen menu, or by moving an onscreen cursor to a designated corner of the screen. In response to such user input, the current state of the user interface is saved (203), the user interface is temporarily inactivated (204), an animation or effect is played or presented to introduce the dashboard (205) and the dashboard is displayed with one or more widgets (206). If applicable, a previous state of the dashboard is retrieved, so that the dashboard can be displayed in its previous configuration.

In some implementations, the dashboard is overlaid on an existing desktop user interface (UI). When the dashboard is activated, the existing UI may be faded, darkened, brightened, blurred, distorted, or otherwise altered to emphasize that it is temporarily inactivated. The existing desktop may or may not be visible behind the dashboard. The desktop can also be shrunk to a small portion of the display screen while the dashboard is active, and can be re-activated by clicking on it. In some implementations, the desktop is shrunk and presented as a widget. The desktop can be re-activated by clicking on the widget.

The user interacts with and/or configures widgets as desired (207). In some implementations, the user can move widgets around the screen, and can resize widgets if applicable. Some widgets are resizable and some have a fixed size. A widget author can specify whether a widget can be resized. Some widgets automatically resize themselves based on the amount or nature of the data being displayed. Widgets can overlap and or repel one another. For example, if the user attempts to move one widget to a screen position occupied by another widget, one of the widgets is automatically moved out of the way or repelled by the other widget.

The user dismisses the dashboard (208) by invoking a dismissal command, which causes the normal UI to return or re-present itself to the display screen. In some implementations, the dashboard is dismissed when the user presses a function key or key combination (which may be the same or different than the key or combination used to activate the dashboard), or clicks on a close box or other icon, or clicks on negative space within the dashboard (e.g., a space between widgets), or moves an onscreen cursor to a predefined corner of the screen.

In some implementations, the dashboard is automatically dismissed (i.e., without user input) after some predetermined period of time or in response to a trigger event. An animation or other effect is played or presented to provide a transition as the dashboard is dismissed (209). When the dashboard is dismissed, the current configuration or state of the widgets (e.g., position, size, etc.) is stored, so that it can be retrieved the next time the dashboard is activated. In some implementations, an animation or effect is played or presented when re-introducing the UI. The UI is restored to its previous state (210) so that the user can resume interaction with software applications and/or the computer operating system.

In some implementations, the dashboard is configurable. The user can select a number of widgets to be displayed, for example, by dragging the widgets from a configuration bar (or other user interface element) onto the dashboard. The configuration bar can include different types of widgets, and can be categorized and/or hierarchically organized. In some implementations, in response to the user dragging a widget onto the configuration bar, the widget is downloaded from a server and automatically installed (if not previously installed). In some implementations, certain widgets must be purchased, so the user is requested to provide a credit card number or some other form of payment before the widget is installed on the user's machine. In some implementations, widgets are already installed on the user's machine, but are only made visible when they have been dragged from the configuration bar onto the dashboard. The configuration bar is merely an example of one type of UI element for configuring the dashboard. Other configuration mechanisms can be used, such as an icon tray or menu system.

It should be apparent that there are many ways in which dashboards and widgets can be displayed other than those implementations described herein. For example, widgets can be displayed on any user interface or user interface element, including but not limited to desktops, browser or application windows, menu systems, trays, multi-touch sensitive displays and other widgets.

Software Architecture

Figure 3:
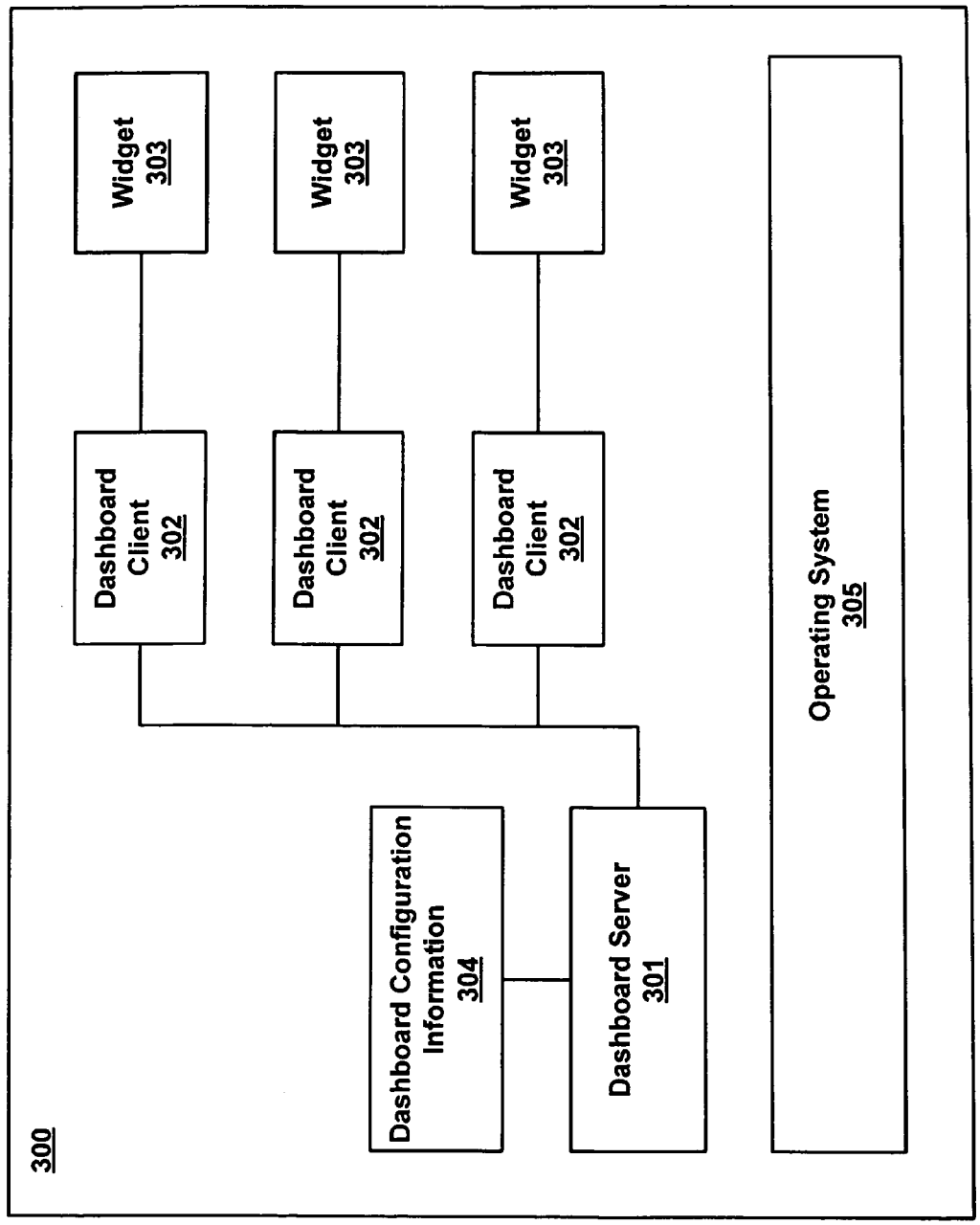
FIG. 3 is a block diagram depicting a software architecture for previewing, installing, managing and operating widgets in a display environment.

FIG. 3 is a block diagram of a software architecture 300 for implementing multiple dashboards. The software architecture 300 generally includes a dashboard server 301, one or more dashboard clients 302, operating system 305 and one or more widgets 303. The server 301 and/or clients 302 use dashboard configuration information 304 to specify configuration options for displaying the widgets 303, including access levels and the like (if applicable). Such configuration information can include information for two or more dashboards configured by the same user or by different users.

In some implementations, the widgets 303 are displayed using HTML and related web technology. The dashboard server 301 manages and launches the dashboard client 302 processes. Each dashboard client 302 loads a widget 303 (e.g., an HTML webpage) and related resources needed to display the page. In some implementations, the dashboard clients 302 display the widgets 303 without a conventional window frame, menu bar, or other components typically associated with on-screen windows. This technique provides a clean, straightforward display of the overall dashboard to reduce confusion and clutter. The dashboard clients 302 display their respective widgets 303 by rendering web pages into a "WebView," as described in U.S. patent application Ser. No. 11/148,010, entitled "Preview and Installation of User Interface Elements in a Display Environment." The size of each WebView is defined as metadata associated with the corresponding widget 303. The server 301 provides data for rendering a separate layer that can be overlaid on the normal desktop of the user interface. The widgets 303 are rendered into the separate layer which is drawn on top of the normal desktop, so as to partially or completely obscure the desktop while the dashboard is active.

Dashboard Server

The dashboard server 301 can be a stand-alone process or embedded in another process or operating system 305. The server 301 can be located at the computer 102 or at the remote server 107. In some implementations, the server 301 provides functionality for one or more processes, including but not limited to: non-widget UI management, window management, fast login, event management, loading widgets, widget arbitration, Core Image integration and widget preference management, as described in U.S. patent application Ser. No. 11/148,010, entitled "Preview and Installation of User Interface Elements in a Display Environment."

Dashboard Client

In some implementations, a dashboard client 302 is a process that uses, for example, objects that are defined as part of a development environment, such as Apple Computer's Cocoa Application Framework (also referred to as the Application Kit, or AppKit) for the Mac OS® operating system. In some implementations, the dashboard clients 302 can be implemented as simplified browser screens that omit conventional interface features such as a menu bar, window frame, and the like.

Widget Format

In one implementation, each widget 303 is implemented as an HTML file. The HTML file can reference other local and remote resources such as style sheets (e.g., Cascading Style Sheets), other HTML files, JavaScript files, images, and the like. Widgets 303 can be implemented using, for example, a flat bundle file format or a packaged HTML file format. In some implementations, the Flat Bundle format includes an info.plist file.

The Info.plist files describes a widget 303 and provides an identifier for a widget 303. Table I provides an example of Info.plist file contents.

TABLE I

Example of Info.plist File Contents

| Key | Type | Description/Value |
| --- | --- | --- |
| CFBundleIdentifier | CFString | com.apple.widget <widget name> |
| CFBundleName | CFString | Name of the widget. |
| MainHTML | CFString | Name of main HTML resource. |
| Width | CFNumber | Default width of the widget. |
| Height | CFNumber | Default height of the widget. |
| DefaultImage | CFString | Resource name of default PNG file. |
| Plugin (optional) | CFString | Resource name of native plug-in. |
| AllowFileAccessOutsideofWidget | Boolean | Access to files across the file system; limited by the users permissions. |
| AllowFullAccess | Boolean | Access to the file system, Web Kit and standard browser plug-ins, Java applets, network resources, and command-line utilities. |
| AllowInternetPlugins | Boolean | Access to Web Kit and standard browser plug-ins. |
| AllowJava | Boolean | Access to Java applets. |
| AllowNetworkAccess | Boolean | Access to any resources that are not file based. |
| AllowSystem | Boolean | Access to command-line utilities using widget script object. |

The keys AllowFileAccessOutsideofWidget, AllowFullAccess AllowInternetPlugins, AllowJava, AllowNetworkAccess, and AllowSystem are Boolean types that can be set by a widget author to enable certain levels of resource access.

Dashboard Invocation

Figure 4A:
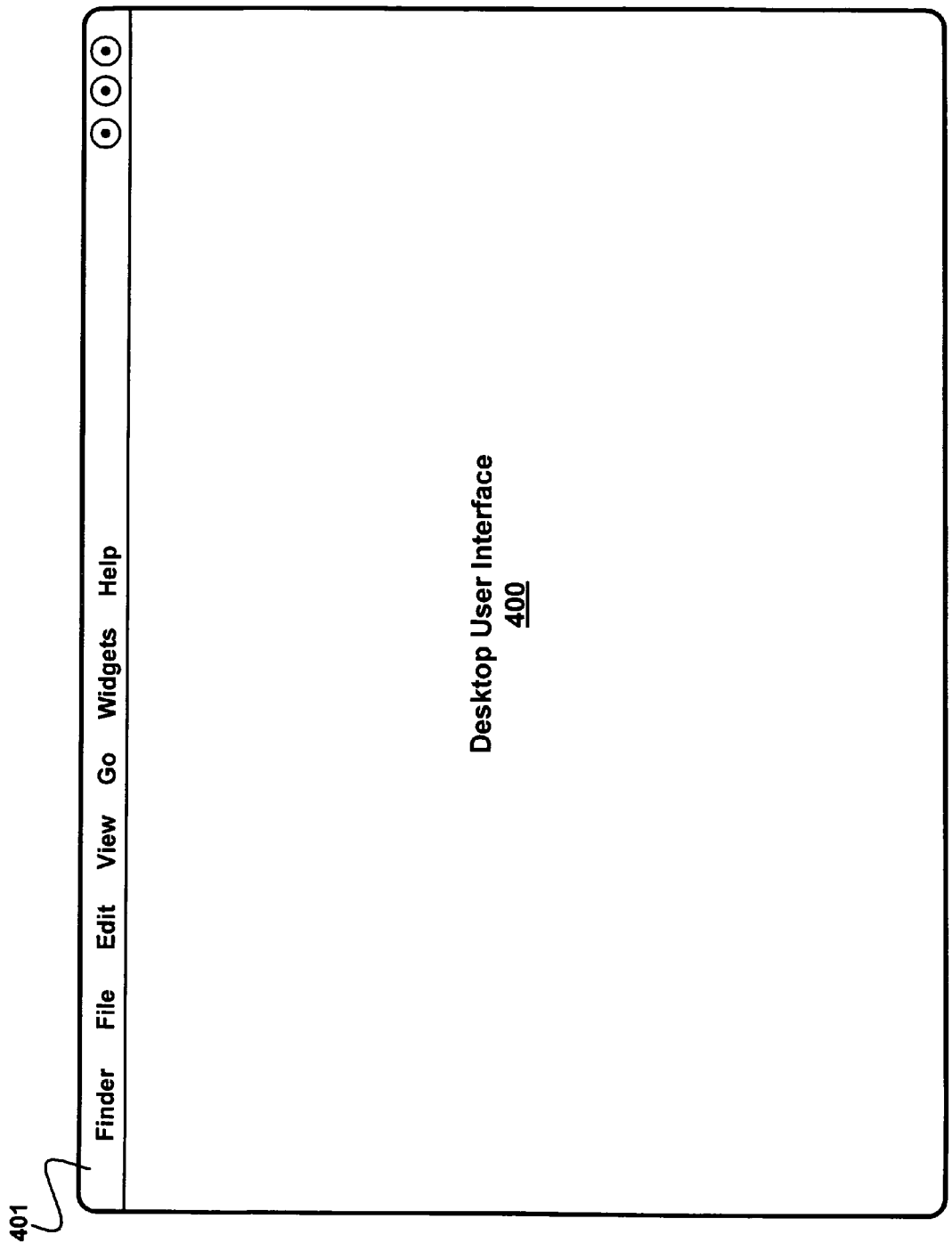
FIG. 4a is a screen shot depicting a desktop user interface prior to activation of a dashboard.

FIG. 4a depicts a desktop user interface 400 prior to activation of a dashboard. The desktop user interface 400 (also referred to herein as "desktop") is a conventional user interface as may be provided by an operating system, such as Mac OS®. The desktop 400 has a background image, menu bar 401, and other standard features. As is known in the art, the desktop 400 may also include windows, icons, and other elements (not shown). The user activates the dashboard by selecting an item from a menu, or by clicking on an icon, or by pressing a function key or key combination, or by some other means for invoking activation.

Figure 4B:
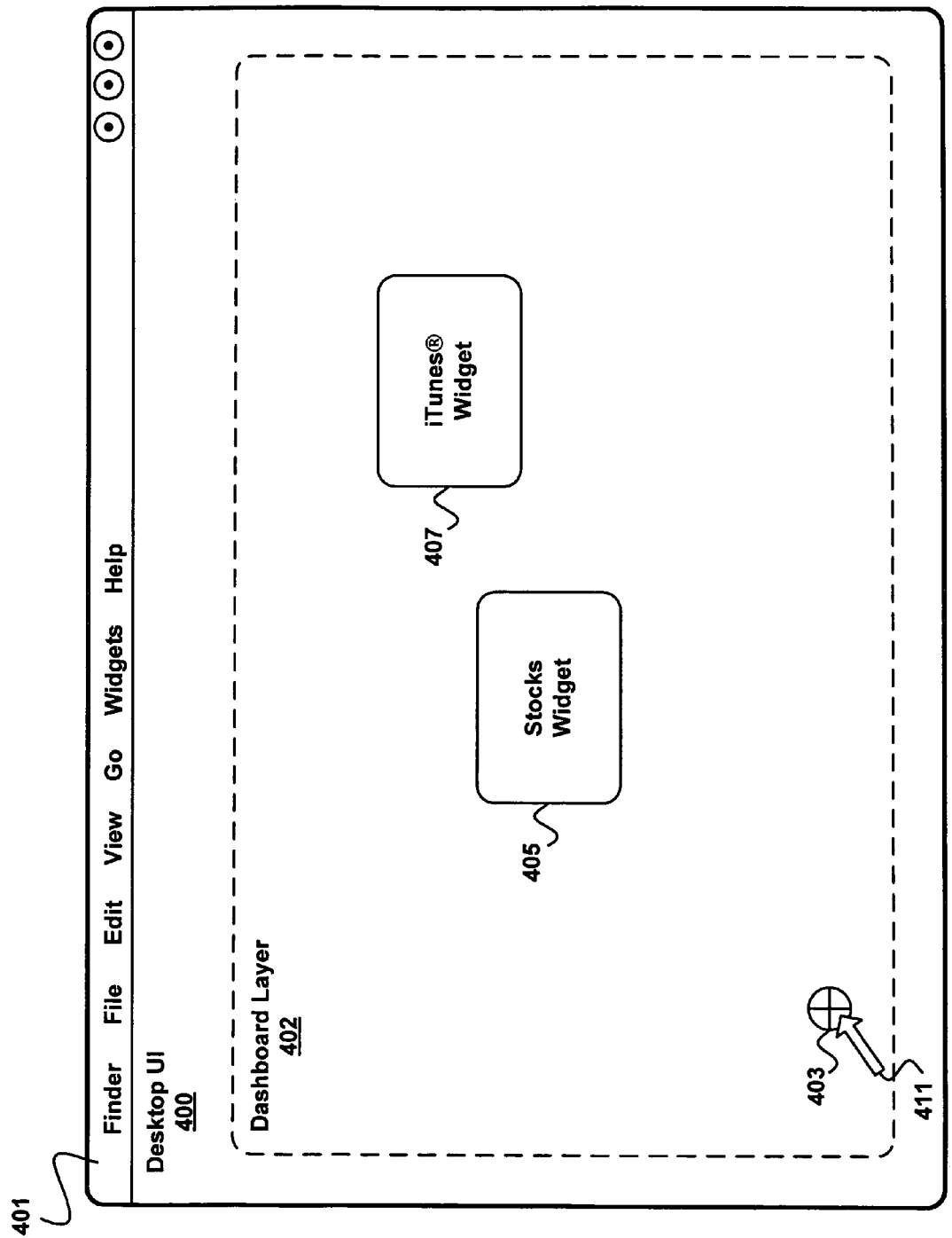
FIG. 4b is a screen shot depicting an initial state for a dashboard.

FIG. 4b depicts an initial state for a dashboard layer 402. In some implementations, a configuration bar icon 403 is initially displayed. Alternatively, upon activation the dashboard layer 402 can display one or more default widgets 405, 407. If the dashboard layer 402 has previously been activated and configured, the widgets 405, 407, can be displayed as previously configured. As shown in FIG. 4b, the dashboard layer 402 is not necessarily visible as a distinct layer. However, its various components (such as widgets, icons, and other features) are visible. In some implementations, these components are displayed in a transparent layer, thus maintaining the visibility of the desktop 400 to the user. In some implementations, the desktop 400 and its components are darkened (or blurred, or otherwise visually modified) while the dashboard layer 402 is active, so as to emphasize that the desktop 400 is temporarily inactive. In other implementations, the desktop 400 is not visible while the dashboard layer 402 is active. The user can reactivate the desktop 400 and dismiss the dashboard layer 402 by clicking on an area of the screen where no dashboard element is displayed (i.e., "negative space"). In some implementations, other commands, key combinations, icons, or other user input can be used to dismiss the dashboard layer 402.

Figure 4C:
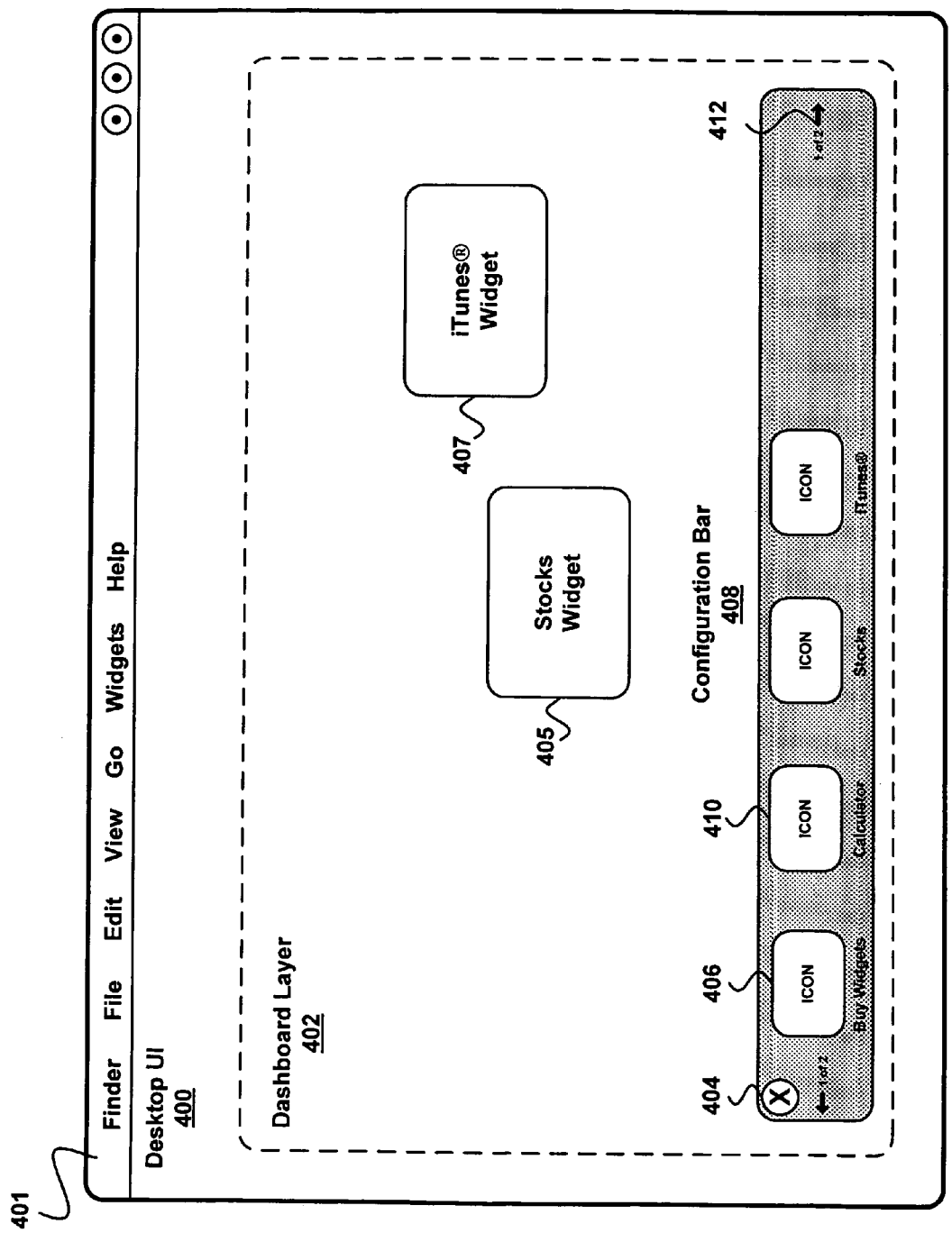
FIG. 4c is a screen shot depicting a configuration bar for a dashboard.

In some implementations, the user can drag the icon 403 to any location on the screen, and the position of the icon 403 will remain persistent from one invocation of the dashboard layer 402 to the next. The user can click on the icon 403 to activate the configuration bar 408, as shown in FIG. 4c. The configuration bar 408 provides access to various widgets that can be placed on the dashboard. In some implementations, a text label is shown for each available widget (e.g., calculator, stocks, iTunes®, etc.). In some implementations, an icon is shown for each available widget (e.g., calculator icon 410). If many widgets are available, the widgets may be arranged hierarchically by type (e.g., game widgets, utility widgets, etc.), or alphabetically, or by any other categorization methodology. For example, a number of categories may be displayed, and clicking on one of the categories causes a pull-down menu to be displayed, listing a number of widgets in that category. In some implementations, a buy widget 406 is also available, allowing the user to select widgets from an online store or website.

Note that the particular configuration and appearance of configuration bar 408 in FIG. 4c is merely exemplary, and that many other arrangements are possible. For example, widgets can be installed from other locations, other applications or other environments, without requiring that they first be part of the configuration bar 408. The user can dismiss the configuration bar 408 by clicking on dismissal button or icon 404.

Alternative Implementation of Configuration Bar

FIGS. 4g-4i illustrate an alternative implementation for deleting a widget from a configuration bar 416. For example, when a user moves a cursor onto the "calculator" label (e.g., a mouse-over) associated with a calculator widget 418, the label is highlighted or otherwise altered, and a delete mechanism (e.g., a delete button) is displayed. If the user clicks or otherwise invokes the delete mechanism, a confirmation overlay 420 is displayed asking the user to confirm the removal and/or deletion of the "calculator" widget. In some implementations, the confirmation overlay 420 is semi-translucent. If the user requests deletion (e.g., clicking the "yes" button), then the calculator widget 418 is removed from the configuration bar 416, as shown in FIG. 4i.

Installation of Elements

Elements, including user interface elements such as widgets can be installed in a display environment as discussed below. One display environment, a dashboard, will be used for illustrative purposes. Installation can include a preview operation as is discussed below. Installation can include selection of the element, such as by a drag and drop action. Other selection means can be used. In one example, a user can drag widgets from configuration bar 408 onto the surface of the dashboard (in other words, anywhere on the screen), using standard drag-and-drop functionality for moving objects on a screen.

Figure 4D:
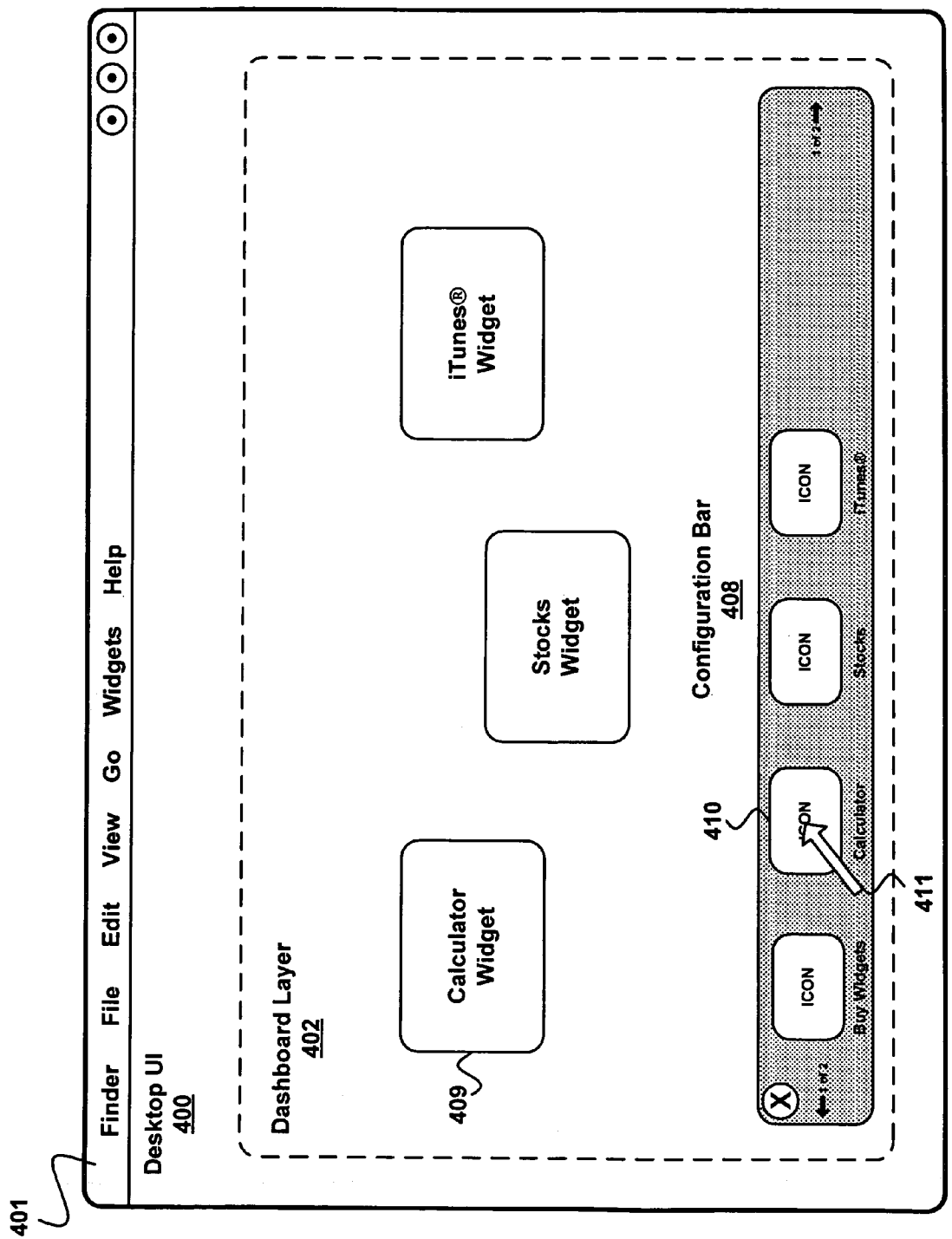
FIG. 4d is a screen shot depicting user selection of a widget from the configuration bar.

FIG. 4d depicts the selection of the calculator widget icon 410 from the configuration bar 408. The calculator icon 410 which is associated with a calculator widget 409 is highlighted, or otherwise augmented or embellished, to indicate that it has been selected by a user with cursor 411.

In some implementations, widgets in the configuration bar 408 are smaller than their actual size when installed. When the user clicks on a widget and begins to drag it into a dashboard or other display environment, the widget is animated to its actual or installed size to assist the user in the real-time layout of the dashboard. By animating the widget to its actual size, the user will know the actual size of the widget prior to its installation.

In some implementations, an animation, such as a ripple animation, is shown when the user "drops" a widget by releasing a mouse button (or equivalent input device) to place a widget at the desired location. In one implementation, the dragging of the widget to the dashboard layer 402 invokes an installation process for installing the widget including previewing. After installation, the user can move a widget, to any other desired location, or can remove the widget from the screen, for example by dragging it off the screen, or dragging it back onto the configuration bar 408, by invoking a remove command, disabling a widget in a menu associated with a widget manager or canceling the installation during the preview, as described with respect to FIGS. 5, 6 and 7. In some implementations, the position, state, and configuration of a widget are preserved when the dashboard layer 402 is dismissed, so that these characteristics are restored the next time the dashboard layer 402 is activated.

In some implementations, widgets and/or dashboard layers (including widgets) can be installed from within a running application. For example, a widget and/or dashboard (including widgets) can be an attachment to an email. When the user clicks the attachment, an installation process is invoked for the widget and/or dashboard which can also include a preview.

Widgets can be created or instantiated using an installer process. The installer process can include a separate user interface or an integrated user interface (e.g., integrated in the display environment or separate from the display environment for example in another display environment associated with another application, such as an email application) for selecting and installing widgets in a display environment. Thus, the installation area for the widget can be embedded within an application display area or window. For example, if a user receives a widget as an attachment to an email, the user can invoke and install the widget from within the email message window without the need for a separate installation window.

In general, an installer process is used to provide additional functionality to the creation/instantiation process, beyond the simple drag and drop operation describe above. Additional functionality can include preview, security and deletion functionality in a singular interface. The installer process can be a separate process or combined in another process. The installer process can itself be a separate application that is executable to install widgets (or other elements) in a display environment. As used herein, the term "process" refers to a combination of functions that can be implemented in hardware, software, firmware or the like.

Installer Process Engines

Figure 5:
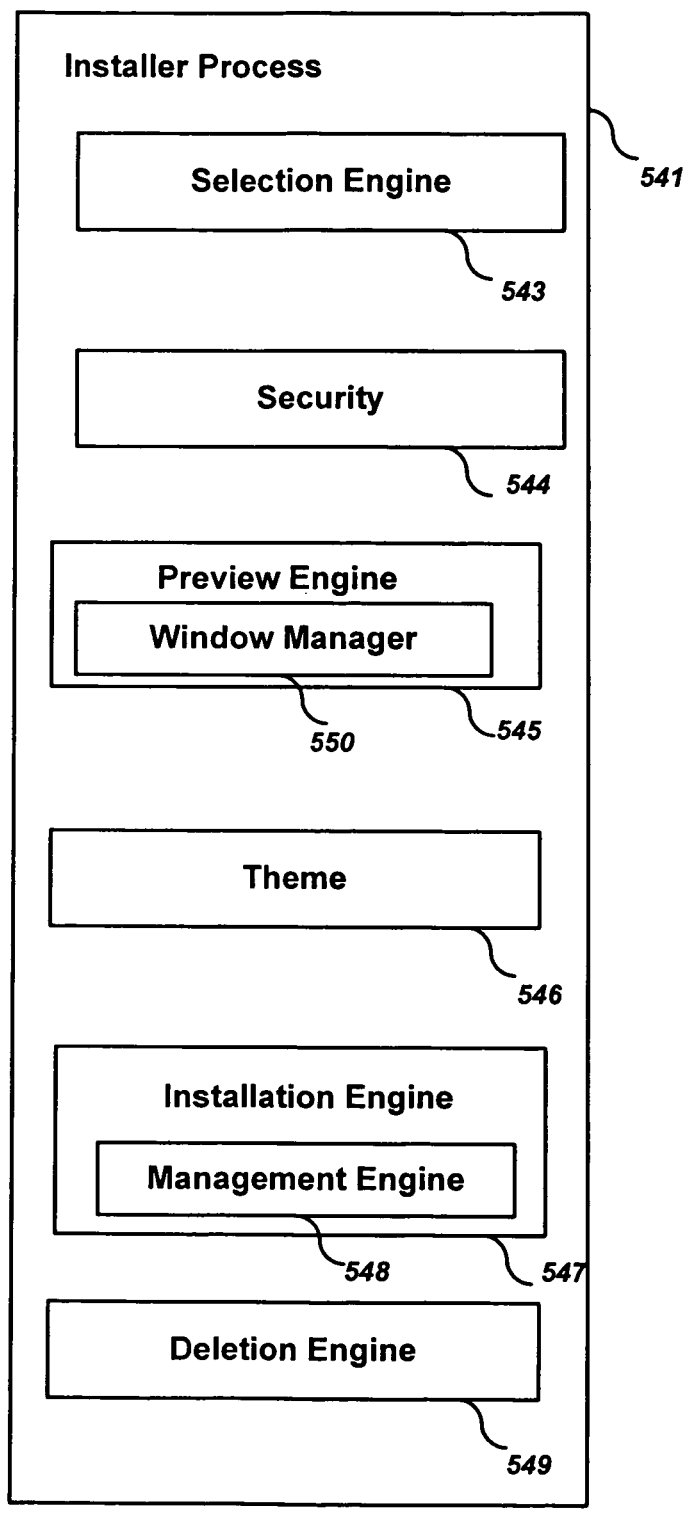
FIG. 5 is a block diagram of an installer process.

FIG. 5 is a block diagram of an installer process 500 for installing widgets in a display environment, including a selection engine 543, a security engine 544, a preview engine 545, a theme engine 546, an installation engine 547, and a deletion engine 549.

Selection Engine

The selection engine 543 is used to select and present (e.g., a static presentation) a widget for installation. The selection engine 543 can be invoked in a display environment and can produce an installation area (e.g., a dialog, a panel, a window, etc., and hereinafter referred to as an "installation window"), that acknowledges the user's initiation of the installer process. The installation window can include a presentation of a selected widget (or a reference thereto as described below), along with various buttons that may be activated by the user or otherwise to invoke functionality in the installer process.

Figure 4E:
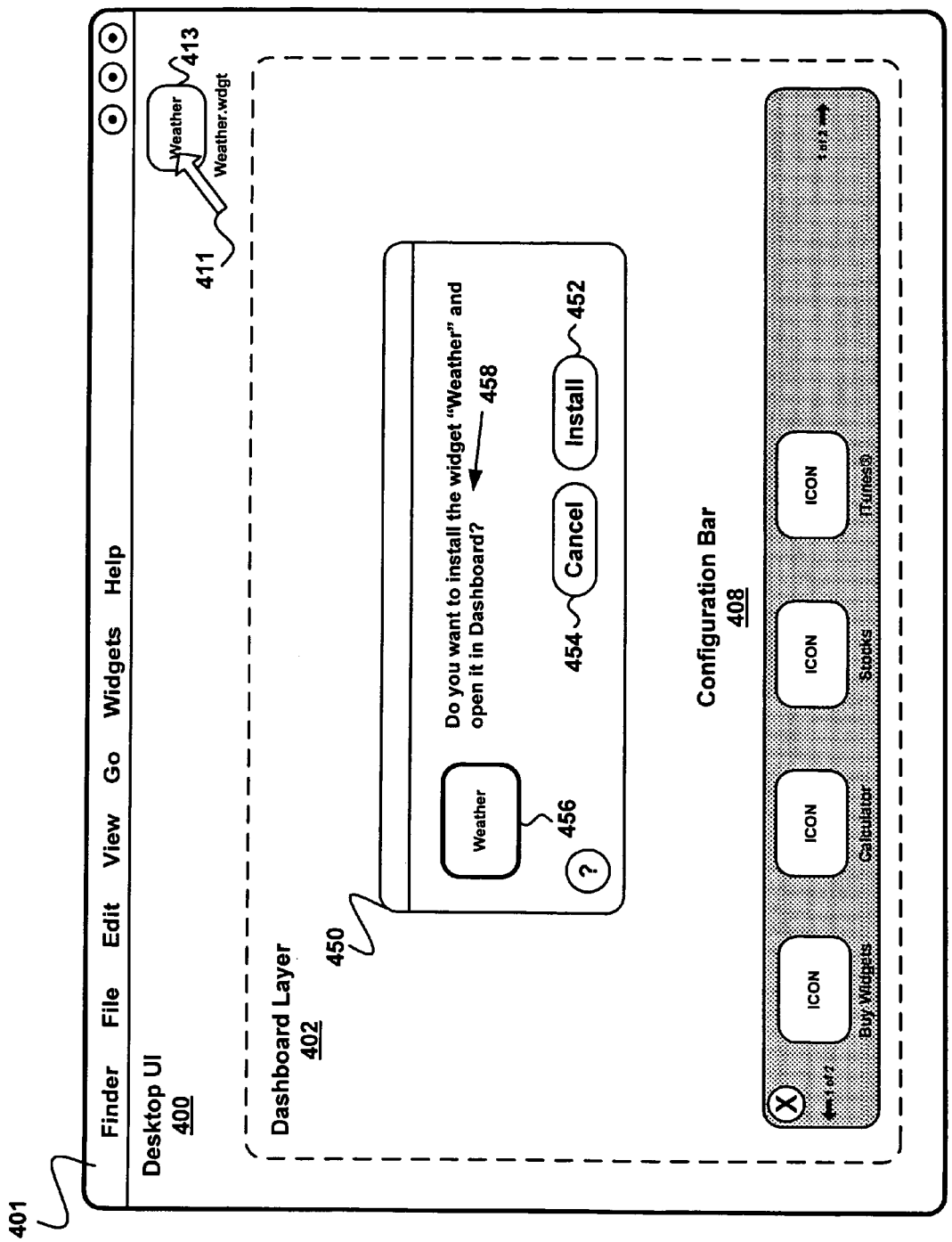
FIG. 4e is a screen shot depicting an installation confirmation.
Figure 4F:
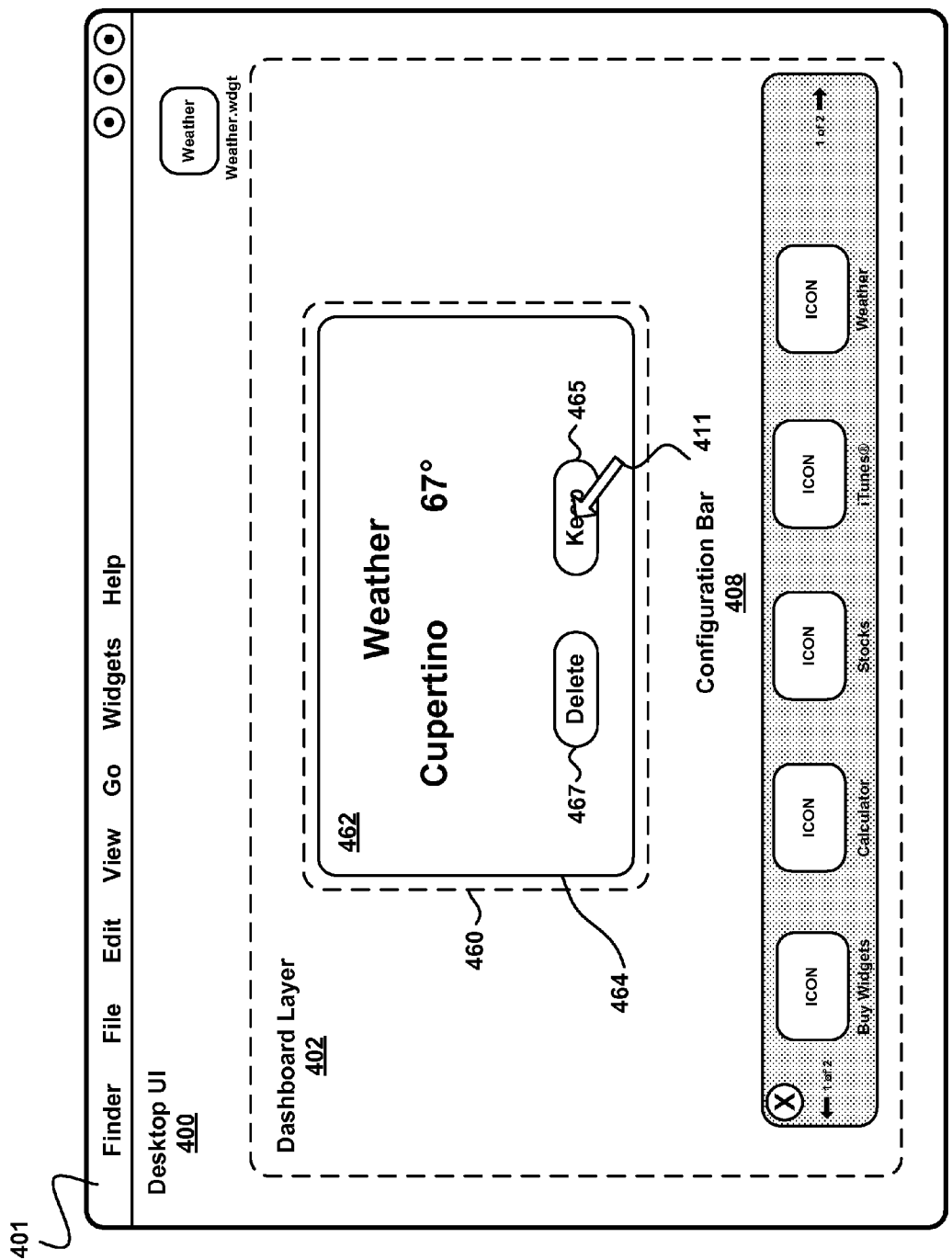
FIG. 4f is a screen shot depicting a preview of a user interface element that has been selected to be installed.

A screen shot showing an installation window 450 in a user interface is shown in FIG. 4e. Installation window 450 can include one or more interactive features (e.g., buttons) that allow a user to install (e.g., install button 452), or cancel the operation (e.g., cancel button 454). In some implementations, preview is automatic. Alternatively, preview can be selected for enablement prior to installation. Installation window 450 can include a reference 456 and a prompt 458, as described below.

In some implementations, the installation window 450 is invoked by clicking on a widget file or package. For example, a weather widget file 413 (e.g., "weather.wdgt") can be downloaded to the desktop 400 from a web site. When the user double clicks the "weather.wdgt" file with cursor 411, the installation window 450 is displayed in the dashboard layer 402, as shown in FIG. 4e.

In some implementations, a user can select a widget for installation using a remote control device (e.g., infrared device, mobile phone, etc.). For example, a dashboard and/or widgets can be displayed on a display device (e.g., television screen, computer monitor, etc.). The user can use the remote control to select widgets from a menu or configuration bar 408 for installation. The widgets can be displayed in one of multiple resolutions, which is selectable by the user via the remote control. For example, a user can select a widget to be scaled to fit a desired portion of the display device (e.g., full screen).

Security Engine

The security engine 544 is used to determine a security access level (or risk level, or both) for either the user or the element to be installed. Security engine 544 can be used to limit the ability of the user to install particular kinds of elements (e.g., based on categories or criteria). In addition or alternatively, security engine 544 is used to determine a security access level (or risk level or both) of an element to be installed. Based on the security access/risk level, one or more operational or functional constraints can be placed on the element during the preview process. For example, limitations on the ability of the previewed element to interact, access, read or write data, monitor output of other system resources, access other system resources, or other limitations can be invoked. The invocation can be temporary, for a predetermined time period, or until the preview has terminated and complete (non-limited) installation has been performed. Functionality or operations of the element can be enabled or disabled, depending on the access level. The security engine 544 can use metadata associated with the element to be installed, user input, contextual information, file type information, default data, read/write preferences, cookies and/or other information to determine the access/risk level. Access control lists including white lists (e.g., including lists identifying certified or otherwise safe elements), black lists (e.g., including lists identifying un-certified or otherwise un-safe elements) and the like can be used to determine the access/risk level.

In some implementations, widgets are rated according to their content (e.g., adult content, violence, strong language, etc.). The rating can be determined by the author a third party rating organization. The rating can be used to determine whether a widget will be installed and/or previewed. In some implementations, users can specify which widgets can be installed and/or previewed based on ratings. For example, a parent may specify via a preference pane or other input mechanism that widgets containing adult content ratings will not be installed nor previewed (i.e., parental controls).

In some implementations, widgets are digitally signed by their authors. Digital signatures can be incorporated in files bundled with the widget and can be generated using one or more known digital signature techniques (e.g., key exchange, hashing, message digest, etc.). The digital signature can also be authenticated using a digital certificate issued by a certificate authority using techniques known in the art.

Various techniques for widget security is described in U.S. Provisional Patent Application No. 60/730,956, entitled "Widget Security."

Preview Engine

The preview engine 545 is used to preview (e.g., dynamically) an element (e.g., a widget) that has been selected to be installed. Referring again to FIG. 4f, the preview engine 545, when invoked, provides an area (hereinafter "a presentation area or presentation window 462" or specifically a "widget window" when used to display a widget) into which the selected element can be displayed. In some implementations, the presentation window 462 is a separate process and embedded within an underlying installer window (i.e., the installation window 460) which, in one implementation, is itself a separate process. In one implementation, the preview engine 545 provides a presentation of a fully functional element/widget in the presentation window 462. The term "fully functional" refers to both the presentation of the widget in terms of size, shape, content and the like along with any supported interactivity features. Alternatively, limitations on the functionality, interactions and the like can be set by the security engine 544 as discussed above. Interactivity can include the separate refreshing of content in the presentation window 462. Alternatively, the content can be static, and only present ornamental properties.

Associated with the preview is a preview designator 464. In one implementation, the preview designator 464 is displayed along with the user interface element being installed (e.g., widget). The preview designator 464 can be of the form of a frame, a carpet on which the presentation window 462 is disposed, a preview theme element, or other designator that overlays, surrounds, bounds or otherwise is associated with the presentation window 462. The preview designator 464 can be a separate process and embedded within an underlying installer window (e.g., the installation window 460) or the presentation window 462 which, in one implementation, may themselves be a separate process. The preview designator 464 is provided to indicate to a user that the element is being previewed and, as of yet, has not been fully installed in the display environment. Further emphasis can be used to convey this information including by using highlights, emphasis, de-emphasis, effects, transitions and the like. The combination of the presentation window 462 and the preview designator 464 comprise an installation area for the user interface element to be installed. The installation area can be part of the display environment in to which the element is to be installed (e.g., part of the dashboard) or part of a separate display environment (e.g., part of another user interface, another user interface element, another application, or process, etc.).

When displaying a fully interactive widget in the presentation window 462, user input can be accepted that can result in changes in the presentation. For example, if the widget includes a URL that may be linked to, interaction can include the generation of an underlying page request and the presentation of the requested page in the presentation window 462. Interaction with user interface elements is described in U.S. patent application Ser. No. 11/145,561, for "Application Clipper." If the interaction is not allowed, a display prompt can be shown to indicate that the operation or function is temporarily disabled during the preview operation.

Window Manager

In some implementations, a window manager 550 is associated with the preview engine 545. The window manager 550 can be a separate process that is used to support the interaction between the presentation window 462, preview designator 464 and the installation window 460 described above. In some implementations, the logic associated with the window manager 550 can be implemented in a same or separate process from the installer process or the preview process. In some implementations, the window manager 550 controls the interaction of the respective windows. Specifically, three separate interactions can be controlled.

First, in some implementations, each window is a separate process displayed and brought forward (in a window hierarchy) together. The bringing together of the multiple distinct windows, each associated with separate processes can be controlled by the window manager 550.

Second, in some implementations, the presentation window 462, preview designator 464 and the installation window 460 are required to interact with each other in predefined ways. For example, the presentation window 462, preview designator 464 and the installation window 460 need not only to be brought forward together, they must also be controlled when interactions are required for the windows once displayed. For example, if one window is moved, i.e., using a drag and drop operation, the multiple windows are managed so that the presentation remains unified (i.e., the presentation window 462 and preview 464 designator are maintained within the installation window 460, though the installation window 460 was the process that received the user interaction to move). To accomplish such, window manager 550 provides an interface between the windows to allow for the receipt of input in one process and the translation to the other process.

Third, in some implementations the windows must be maintained within operating constraints of each underlying process. For example, when one window is resized (i.e., the installation window 460 is resized), the window manager 550 controls the relative presentation of the other windows (continuing this example, when the installation window 460 is resized, the presentation window 462 and preview designator 464 may be repositioned to be centrally displayed in the installation window 460). Note, this third level of management includes management of process constraints. Process constraints include limitations on the changes that can be performed within the context of the installer process for any of the windows. For example, a minimum size constraint can be associated with the underlying presentation window 462, such that resizing of the associated installation window 460 can be constrained to not be so small as to be unable to present the minimum sized presentation window 462 in the newly downsized installation window 460.

The preview engine 545 is responsive to an initiation signal/action and provides the display of the selected widget in a presentation window 462 as described above (see FIG. 4*f*). Associated with the presentation window 462 can be one or more input mechanisms (e.g., buttons) that allow a user to continue in the installation process (e.g., a keep or install button 465), or cancel the installation process (e.g., delete button 467). In some implementations, if the installation process is cancelled, the presentation process terminates and returns control to the prior operative environment (i.e., return to the initiating point, for example, reinitiating the selection process).

In some implementations, the installer process does not include or allow for the selective bypassing of the preview presentation (e.g., bypass preview or does not include the preview engine 545). In some implementations, the preview engine 545 is itself a separate process or application (e.g., can be separate from the installer process 541). In some implementations, the preview engine 545 is itself a user interface element (e.g., a preview widget) that can be used to preview widgets prior to installation, deployment, instantiation, or the like.

Theme Engine

Theme engine 546 is operative to provide additional content to accompany the content displayed in the presentation window or installation window. The theme engine 546 is operative to determine a theme to be associated with an item to be installed (e.g., a widget), identify additional content for concurrent display, and facilitate the display of the additional content. Additional content can be of the form of a frame that is used to bound the item to be installed on one or more sides. Examples of additional content include a picture frame, a content player (e.g., a video player, a still image player, etc.). The additional content can be static or include functional elements (e.g., buttons, for example to play content). Alternatively, the additional content can be displayed in an overlay or other overlapping manner, be a separate process or window or be part of the presentation window. The additional content can be stored or retrieved as required. The identification of the additional content by the theme engine 546 can be based on meta-data that accompanies the item to be installed, based on an analysis of the item to be installed, automatically defined based on file type (e.g., all .pic files are provided a picture frame, or all preview files are provided with a preview frame). Themes can be assigned by a user after receipt or prior to transfer to a receiving party.

Installation Engine

The installation engine 547 is operative to install/instantiate the selected widget in the display environment. The installation engine 547 can copy or move as required the selected widget to an appropriate volume and store the data structures (including preference data, identification data, scripts, navigation data and the like) for use in the display environment. In some implementations, the installation engine 547 includes an automatic invocation of the underlying display environment with the installed user interface element presented (i.e., the installation engine 547 installs the widget in, and opens up, a dashboard including the installed widget in a preview mode).

Deletion Engine

The deletion engine 549 provides control for widgets after installation. The deletion engine 549 can be a separate process from the installer process 541, or included therein. The deletion engine 549 can receive input and display user interface elements (dialogs and the like) to ensure that deletion operations are effectuated as required. The deletion engine 549 can be responsive to the selection of a user interface element, a portion of the element, controls associated with the element and the like.

In some implementations, the deletion engine 549 receives mouse over input and displays a graphical element associated with a given identified element. The graphical element can include a control that allows for the activation of the deletion engine. The activation can cause the display of a window (e.g., a confirmation window) to ensure appropriate behavior. Other methods for deleting user interface elements are possible. For example, deletion of a user interface element can also be effectuated during the installation process as discussed above. More specifically, a user interface element can be previewed using the preview engine 545, and subsequently deleted prior to full installation.

Deletion can include deactivating a user interface element and leaving its associated files on the host system or device, or deleting the user interface element and removing all its associated files from the host system or device. The user can be prompted to confirm deletion of a user interface element before deletion is initiated.

In some implementations, the installer process 541 is part of a separate process that is not associated with a dashboard layer. Alternatively, the installer process 541 can be part of a dashboard application and be activated, by for example, by selecting a widget for addition to the dashboard layer. Selection can include for example double clicking on a widget displayed in a configuration bar 408 (shown in FIG. 4*c*). Other installation tools are possible. For example, a widget bar (not shown) can be used to display the widgets that are available for installation in a given display environment. The widget bar can be part of an authoring application for the creation of widgets, or be selectively activated. Alternatively, the installer process 541 can be separately called, with the destination of the widget being defined as part of the application (e.g., into a dashboard environment, a desktop environment, an electronic display device environment, or the like).

Dashboard Environment

In a dashboard environment, installer process 541 can include a widget bar and an associated installer process. The installer process when invoked can cause the display of the widget bar in the user interface. In one implementation, the dashboard layer itself, as currently configured can also be displayed when the installer process is invoked. The installer process can then be invoked to select available widgets for installation from the widget bar, preview widgets, or remove installed widgets (e.g., remove widgets from the widget bar) depending on the configuration of the installer process.

Desktop Environment

In a desktop environment, installer process 541 can be of the form of an installer application that can be invoked (automatically, by the user, by the operating system, by an application or other invocation tool) to present user interface elements that are available to be installed in the desktop environment. The installer application can include a user interface element bar and an associated installer process. The installer process when invoked can cause the display of the user interface element bar in the user interface. The installer process can then be invoked to select available user interface elements for installation from the user interface elements bar, preview user interface elements, or remove installed user interface elements (i.e., remove user interface elements from the user interface elements bar) depending on the configuration of the installer process.

Installation Process

Figure 6:
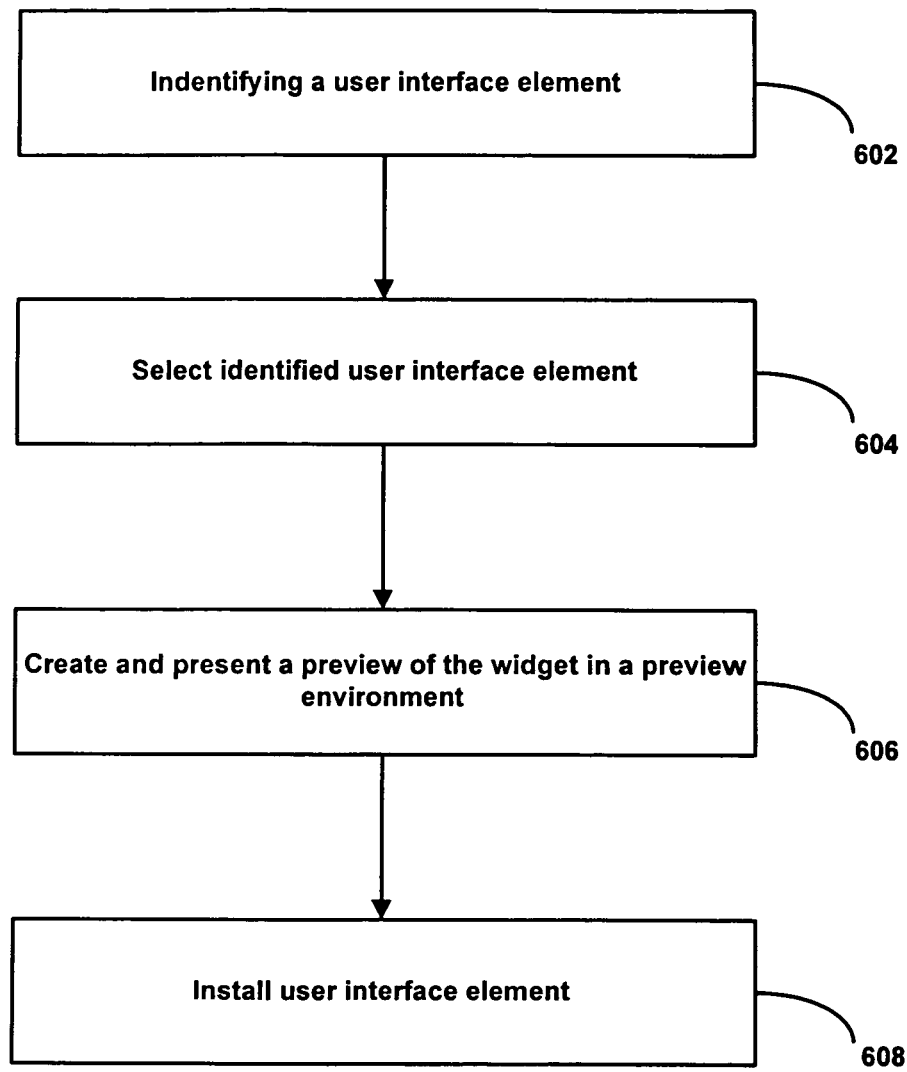
FIG. 6 is a flow diagram of a process for installing a user interface element in a display environment.

FIG. 6 is a flow diagram of a process for installing a user interface element (e.g., a widget) in a display environment. The process includes identifying a user interface element (602). Identifying the user interface element can include locating a widget. Locating can include using a search tool or the like to locate widgets available for installation. Alternatively, other methods can be used for identifying user interface elements for installation including automatic and user controlled identification methods.

After identification, the identified user interface element is selected for installation (604). Selecting a user interface element can include selecting a user interface element from a configuration bar (e.g., configuration bar 408), a widget bar, a tool bar, a menu, an authoring application, or other source. Alternatively, selecting can include dragging or dropping the user interface element onto a display environment (e.g., a dashboard layer), downloading the user interface element from a content source or other source, or other selection process. Selecting can include launching an associated installation process for installing the user interface element, a preview application for previewing the user interface element prior to installation or other application including authoring applications. The launching of the applications can be automatic or user or otherwise selectively controlled.

Upon receipt of the selection, an installation window is presented (e.g., installation window 460). In some implementations, the installation window includes a user interface display portion, a prompt, and one or more interactivity elements. The user interface display portion can include a reference, partial display, or complete (e.g., complete but for the ability to interact, a static display) display of the user interface element that has been selected. The reference (e.g., reference 456) can be a complete reference, a pointer, a designator, a still image, or otherwise that identifies the candidate user interface element for installation. In this way, the user is able to recognize that the selection made corresponds to content (e.g., a widget) that the user desires to install.

The prompt can be of the form of a confirmation to the user of the underlying action (e.g., prompt 458). In one implementation the prompt can be used to confirm a desire to install a named widget. In other implementations, the prompt can be used to confirm not only the named user interface element for installation, but the display environment into which the user interface element will be installed (e.g., "Install named widget #1 on my desktop?" or "Install widget #1 on dashboard #1 of 2?"). In still other implementations, the prompt can include a confirmation of an action (e.g., "install the widget and open it in my dashboard").

The interactivity elements can be of the form of buttons or the like. In one implementation, the installation window includes two interactivity elements including a cancel element (e.g., a cancel button 454), and an installation element (e.g., an installation button 452). Other interactivity elements are possible, including those that link to other associated applications, content sources (e.g., to allow for the selection of a different widget for installation), preview option (e.g., if not automatically previewed) and the like.

Continuing with the method, if a preview option is selected or required (optional), then a preview of the widget in a preview environment is created and presented (606). The creation of the preview environment can include the invocation of a window management engine (e.g., window manager 550) for managing the interaction of one or more windows that make up the preview. In some implementations, the preview includes a presentation window (e.g., presentation window 462) and a preview designator (e.g., preview designator 464) that are separate processes. The presentation window is used to display an instantiation of the selected widget. In some implementations, the display of the presentation window includes an instantiation of the selected widget in a selectable interactive environment. The preview designator is provided to clearly indicate that the preview operation is being performed, as opposed to a conventional direct installation. In some implementations, the preview is presented at a same location in the user interface. Alternatively, if other elements are present at this location, another location or an temporary overlay can be used. In some implementations, the preview designator is a carpet, onto which the presentation window is laid (e.g., layered, overlaid, or the like).

In some implementations, theme content can be presented along with the user interface element in the preview installation window. The theme content can include a theme presentation element that operates as the preview designator (e.g., additional content that is recognized as being part of a preview of an item, for example a preview Title or the like). Other theme content can be presented to preview how the final installed version of the user interface element will appear. For example, assuming a theme border is to be presented with the user interface element at installation, the preview can include the same theme border.

Associated with the preview process may be an authoring or selection process. For example, if the preview displayed is not satisfactory to a user (e.g., the theme content is unsatisfactory), an interactivity element can be presented in the user interface to allow the direct launching of another process (e.g., a search process or application, an authoring application, a selection application or other process or application so that a more appropriate/desirable user interface element can be located/installed) with or without terminating the installation process.

Finally, the user interface element can be installed (608). The installation of the user interface element can include the installation on a tool bar (e.g., a widget bar), in a resource, in a widget manager or in a display environment (e.g., directly on a dashboard layer or the desktop). Installation can include the saving of the underlying content metadata including data structures defining the user interface element in a library or the like. Alternatively, the installation can be part of an underlying application (e.g., directly in an associated dashboard application or a library associated therewith). In some implementations, the installation of the user interface element includes the removal of the preview designator. For example, where a carpet is used to designate the preview, the carpet can be removed for the final installation. In one implementation, the final installation is performed at a same location in the user interface as the preview. In some implementations, an animation or other transition effect can be used when moving from preview to final installed user interface elements. Transitions can include the appearance of pulling of the a carpet preview designator from under the user interface element or otherwise making the carpet disappear.

The process steps described can be performed in other orders, repeated or the like to provide desired results. For example, the preview process can be repeated in association with the selection of multiple different user interface elements prior to invoking the installation step.

Once installed, user interface elements can be removed/deleted from the display environment as required. In some implementations, a separate deletion process is provided from the installation process. Alternatively, the installer process can be invoked to remove/delete user interface elements as required.

In some implementations, deletion includes deactivating the widget but the widget remains installed on the system or device. Alternatively, deletion includes removing the widget completely from the system or device. If a request to delete a widget is received in response to a user action (or programmatically by the operating system or another application), then a message providing the user with deletion options can be presented, enabling the user to determine whether the widget will be deactivated and/or removed from the system or device. In some implementations, the system or device executes a default deletion option which can be changed by the user via a preference pane or other input mechanism, or overwritten by an application or other software component or device (e.g., security engine 544).

Widget Searching

In some implementations, widgets are associated with a widget data type or other metadata to enable a search engine (e.g., Apple's Spotlight® search engine) to search for widgets in files, documents, images, emails, applications, etc. Widgets can be indexed based on data type and/or other metadata. For example, a query can be generated requesting a list of all widgets on a host machine and/other machines on a network. The search engine accesses the index to locate widgets on the host machine and/or other machines on a network.

Widget Manager

In some implementations, a widget manager allows users to inspect, remove, enable, disable, show and hide widgets. The widget manager can be a preference pane, a standalone application or a plug-in. The widget manager displays widget information, including but not limited to the widget's title, author, version, class, type, ratings, description, etc. The information can be displayed in any order and format according to one or more sorting criteria, such as alphabetical or chronological order, author, class, rating, etc. In some implementations, the widget manager tracks widget updates and automatically notifies the user or host system or device when an update is available.

In some implementations, the widget manager allows users to perform certain actions on widgets, including but not limited to copying, moving, deleting, uninstalling, deactivating, enabling, disabling, renaming, previewing, showing, hiding, etc. In some implementations, the widget manager includes functionality that allows the import and export of widgets to and from various widget sources (e.g., network, email, CD ROM, etc.). For example, widgets can be imported and exported to and from a web site that can be accessed by multiple users. In some implementations, the widget manager includes a search field that allows users to search for widgets on a host system or device, and/or one or more networked devices.

In some implementations, the widget manager can be invoked by a button or other input mechanism located in a user interface (e.g., desktop, system tray, dashboard layer, configuration bar, etc.). For example, when the button is activated, the widget manager is launched and a user interface is displayed. In some implementations, the widget manager is a widget itself and includes at least some characteristics, attributes or properties of other widgets. For example, the widget manager can be enabled or disabled, resized, hidden, dragged and dropped, flipped to reveal special options or preferences, etc.

In some implementations, the widget manager can be displayed in a format that is consistent with a dashboard theme or content. The appearance and/or properties of the widget (e.g., colors, styles, fonts, etc.) can be changed by a user via a preference pane or other input mechanism.

Example User Interface for a Widget Manager

Figure 7A:
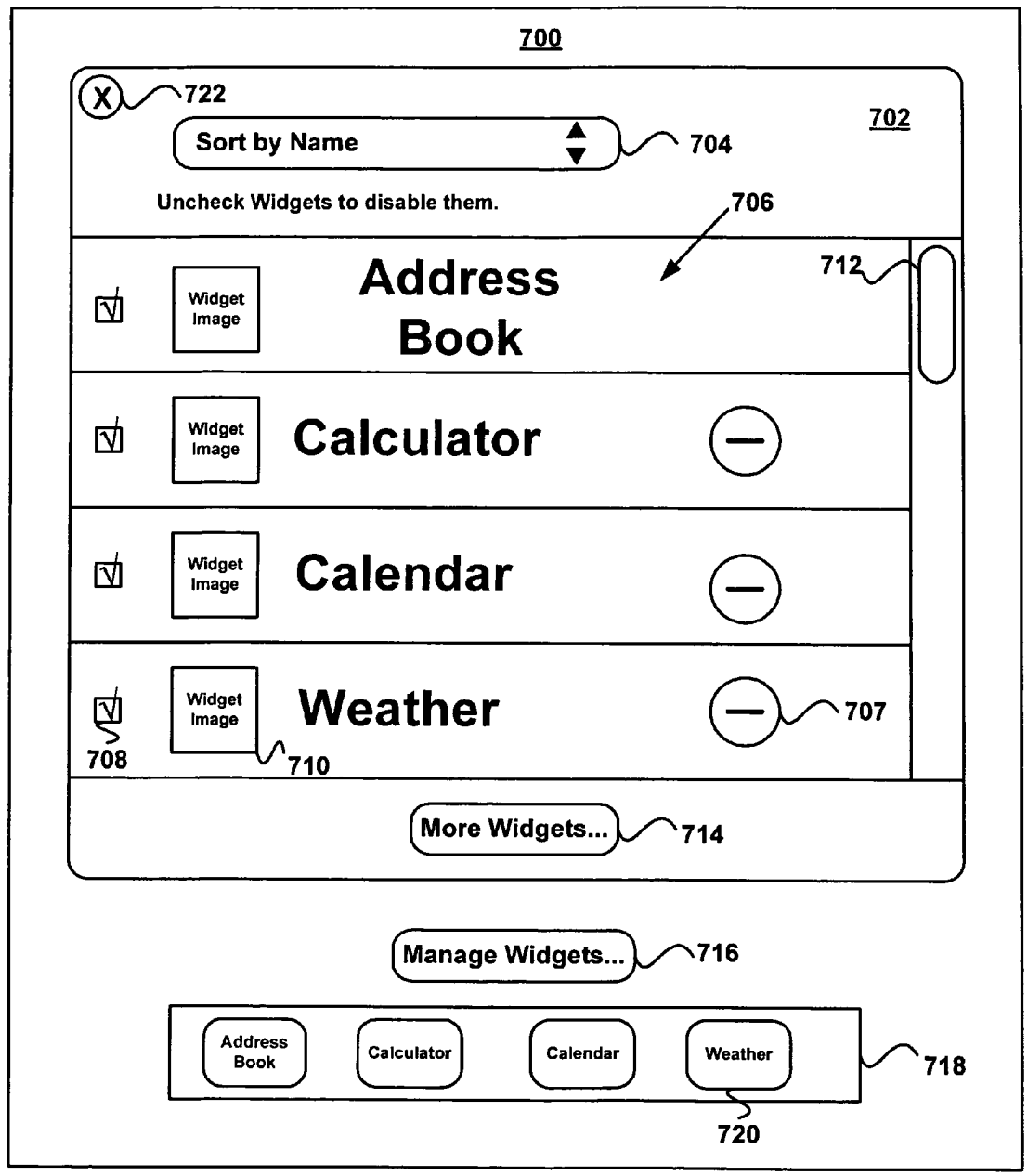
FIG. 7a illustrates a user interface for a widget manager.

FIG. 7a illustrates a user interface 702 for a widget manager. It should be apparent that a user interface for a widget manager can include more or fewer features than shown.

In some implementations, the user interface 702 is displayed in another user interface 700 (e.g., a desktop or dashboard layer) in response to user input. User input can include, for example, clicking on a button 716 (e.g., a "Manage Widgets" button) or other input mechanism located in the user interface 700. The user interface 702 can be dismissed by clicking on button 722 or other input mechanism.

In some implementations, the user interface 702 includes a scrollable list 706 of widget names and/or other attributes which correspond to widgets that have been installed on the host system. In some implementations, the scrollable list 706 includes widgets that reside on the host system but have not been installed (e.g., widgets downloaded to a desktop). This implementation enables users to install widgets from within the widget manager. In some implementations, the list 706 includes names of widgets that reside on another device coupled to the host system via a network connection. In some implementations, a search history is maintained to enable the user to refine search terms and/or re-run a previous search. In some implementations, an event history is maintained which allows users to undo and redo previous widget operations.

Optionally, next to each widget is an icon image 710 associated with the widget that can assist the user in selecting the widget from the list 706. Widgets that are selected to be hidden (e.g., based on a "hide widget" option provided in the widget manager) will not be shown in the list.

The widgets can be scrolled using, for example, a scroll bar 712. Users can also toggle each widget on and off (i.e., enable/disable the widget) by selecting a checkbox 708 located to the left of each widget listing. Similarly, on the right side of some widget listings is a button 707 or other input mechanism that allows users to delete the widget. Note that for this example, widgets that cannot be deleted do not have a corresponding button 707. In some implementation, default widgets or widgets that have been locked may not be deleted.

In some implementations, the user interface 702 includes a menu 704 (e.g., located at the top of the user interface 702) of sorting options that will sort the widget list 706 by name, date, author, rating or any other sorting criteria. In some implementations, the menu 704 includes an option to sort widgets based on whether the widgets are enabled or disabled.

In some implementations, a button 714 (e.g., a button labeled "More Widgets . . . ") or other input mechanism allows a user to search for more widgets located in local directories or on one or more network devices (e.g., a website).

In some implementations, when a widget is enabled (check box 708 is checked) the widget's icon image 720 is displayed in a configuration bar 718 in user interface 700. For example, since the check box 708 associated with the "weather widget" is checked, its icon image 720 is displayed in the configuration bar 718 in user interface 700. Similarly, if the check box 708 is unchecked, then the image icon 720 is not displayed in the configuration bar 718 or its appearance is altered (e.g., grayed out, darkened, made translucent, etc.) to indicate to a user that the widget is disabled.

Figure 7B:
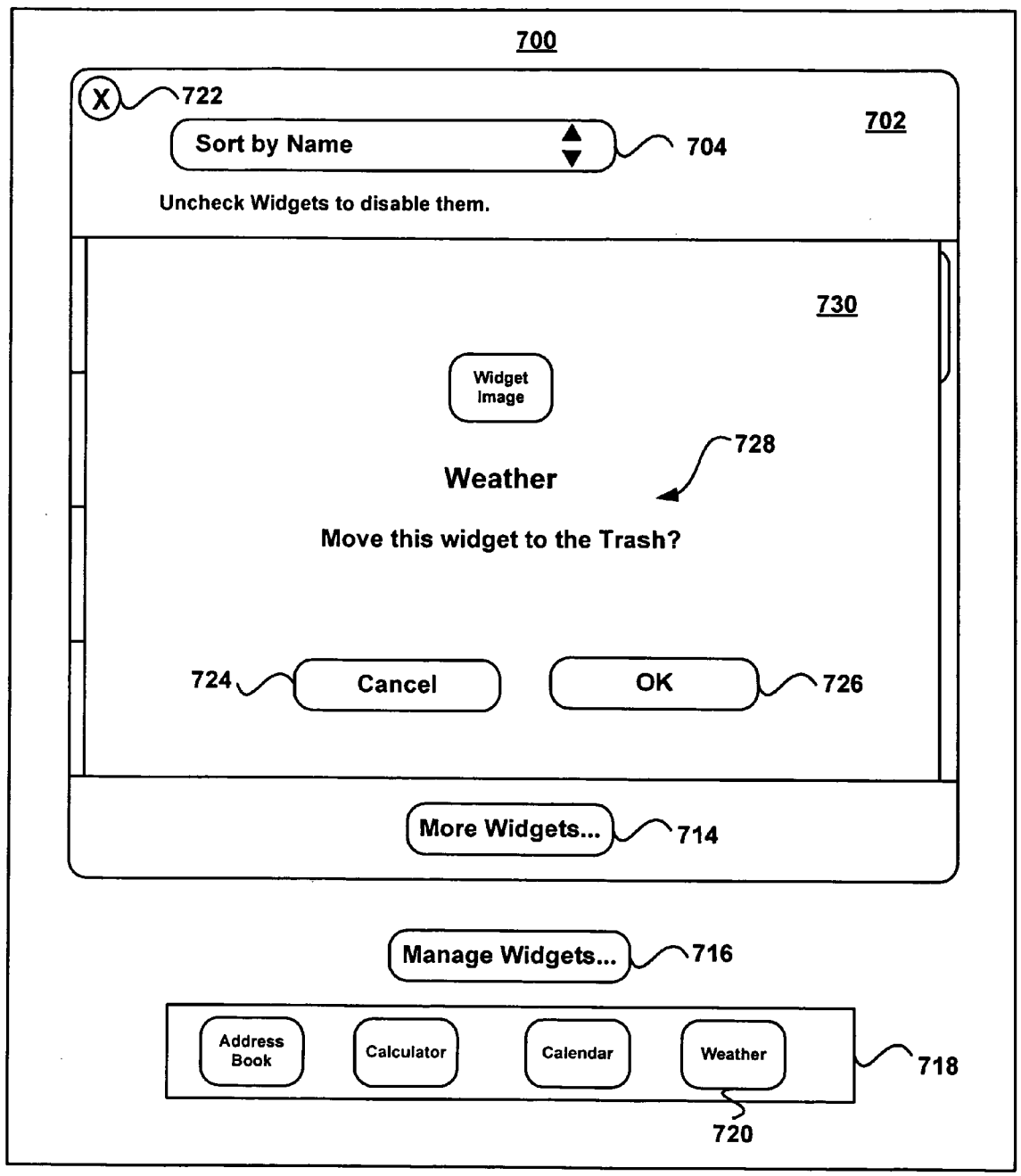
FIG. 7b illustrates a widget manager overlay for confirming deletion of a widget.

FIG. 7b illustrates a widget manager overlay 730 for requesting a user to confirm the deletion of a widget. In some implementations, when clicking the delete button 707 (FIG. 7a), a semi-translucent overlay 730 appears within the user interface 702 including a message 728 requesting the user to confirm their intent to delete the widget. For example, the message 728 could be "Move this widget to the Trash?" The user can respond to the message 728 by clicking a button 726 ("OK"), which results in the widget being moved to the "Trash" or otherwise deleted from the host system. The user can also respond by clicking a button 724 ("Cancel"), which results in the deletion operation being terminated. If a widget is moved to the "Trash" or otherwise deleted, then its icon image 720 is removed from the configuration bar 718 and list 706.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard layer functionality of the present invention; one skilled in the art will recognize that other, non-client/server approaches can also be used.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
    receiving input to install a user interface element in a dashboard layer displayed over a desktop user interface;
    in response to receiving the input to install the user interface element in the dashboard layer:
        making the dashboard layer active;
        making the desktop user interface temporarily inactive,
        modifying an appearance of the desktop user interface relative to the dashboard layer to emphasize that the dashboard layer is active and that the desktop user interface is temporarily inactive;

determining an installation area in the dashboard layer to install the user interface element, the installation area including a presentation area and a frame bounding the presentation area, where the frame is provided to identify a displayed user interface element as being previewed;

displaying a preview of the user interface element to be installed in the installation area;

enabling at least some aspects of operation of the user interface element while displaying the preview; and installing the user interface element in the installation area without the frame.

2. The method of claim 1 wherein installing the user interface element in the installation area comprises:

requesting another input to continue or cancel installation of the user interface element; and installing the user interface element without the frame in response to receiving the other input to continue the installation of the user interface element.

3. The method of claim 2 further comprising:

receiving the other input to cancel the installation of the user interface element instead of continuing installation of the user interface element; and in response to receiving the other input to cancel the installation, not installing the user interface element in the dashboard layer.

4. The method of claim 2 wherein installing the user interface element includes installing the user interface element at a same location as the installation area in the dashboard layer.

5. The method of claim 1 further comprising:

limiting, during the preview, at least one aspect of an operation of the user interface element.

6. The method of claim 5 wherein limiting operation is selected from the group including limiting access to a resource, limiting access to a network, limiting capability to read or write data, limiting interactions of the user interface element and limiting locations where the user interface element may access.

7. A non-transitory computer-readable storage medium having instructions contained thereon, which, when executed by a processor, cause the processor to perform the operations of:

receiving input to install a user interface element in a dashboard layer displayed over a desktop user interface;

in response to receiving the input to install the user interface element in the dashboard layer:

making the dashboard layer active;

making the desktop user interface temporarily inactive, modifying an appearance of the desktop user interface relative to the dashboard layer to emphasize that the dashboard layer is active and that the desktop user interface is temporarily inactive;

determining an installation area in the dashboard layer to install the user interface element, the installation area including a presentation area and a frame bounding the presentation area, where the frame is provided to identify a displayed user interface element as being previewed;

displaying a preview of the user interface element to be installed in the installation area;

enabling at least some aspects of operation of the user interface element while displaying the preview; and installing the user interface element in the installation area without the frame.

8. The medium of claim 7 wherein installing the user interface element in the installation area comprises:

requesting another input to continue or cancel installation of the user interface element; and installing the user interface element without the frame in response to receiving the other input to continue the installation of the user interface element.

9. The medium of claim 8, the operations further comprising:

receiving the other input to cancel the installation of the user interface element instead of continuing installation of the user interface element; and in response to receiving the other input to cancel the installation, not installing the user interface element in the dashboard layer.

10. The medium of claim 8 wherein installing the user interface element includes installing the user interface element at a same location as the installation area in the dashboard layer.

11. The medium of claim 7, the operations further comprising:

limiting, during the preview, at least one aspect of an operation of the user interface element.

12. The medium of claim 11, wherein limiting operation is selected from the group including limiting access to a resource, limiting access to a network, limiting capability to read or write data, limiting interactions of the user interface element and limiting locations where the user interface element may access.

13. A system comprising:

a processor; and a computer-readable storage medium coupled to the processor and having instructions contained thereon, which, when executed by the processor, cause the processor to perform the operation of:

receiving input to install a user interface element in a dashboard layer displayed over a desktop user interface;

in response to receiving the input to install the user interface element in the dashboard layer:

making the dashboard layer active;

making the desktop user interface temporarily inactive, modifying an appearance of the desktop user interface relative to the dashboard layer to emphasize that the dashboard layer is active and that the desktop user interface is temporarily inactive;

determining an installation area in the dashboard layer to install the user interface element, the installation area including a presentation area and a frame bounding the presentation area, where the frame is provided to identify a displayed user interface element as being previewed;

displaying a preview of the user interface element to be installed in the installation area;

enabling at least some aspects of operation of the user interface element while displaying the preview; and installing the user interface element in the installation area without the frame.

14. The system of claim 13 wherein installing the user interface element in the installation area comprises:

requesting another input to continue or cancel installation of the user interface element; and installing the user interface element without the frame in response to receiving the other input to continue the installation of the user interface element.

15. The system of claim 14, the operations further comprising:

receiving the other input to cancel the installation of the user interface element instead of continuing installation of the user interface element; and in response to receiving the other input to cancel the installation, not installing the user interface element in the dashboard layer.

16. The system of claim 14 wherein installing the user interface element includes installing the user interface element at a same location as the installation area in the dashboard layer.

17. The system of claim 13, the operations further comprising:

limiting, during the preview, at least one aspect of an operation of the user interface element.

18. The system of claim 17, wherein limiting operation is selected from the group including limiting access to a resource, limiting access to a network, limiting capability to read or write data, limiting interactions of the user interface element and limiting locations where the user interface element may access.

19. A method comprising:

receiving input to install a user interface element in a dashboard layer overlaid on a desktop user interface;

in response to receiving the input to install the user interface element in the dashboard layer:

making the dashboard layer active;

making the desktop user interface temporarily inactive;

displaying the desktop user interface with a faded or darkened appearance to emphasize that the dashboard layer is active and that the desktop user interface is temporarily inactive;

determining an installation area in the dashboard layer to install the user interface element, the installation area including a presentation area and a frame;

displaying, in the installation area, a preview designator, where the preview designator is distinct from the user interface element and is provided to identify the user interface element as being previewed and not installed;

displaying a preview of the user interface element;

enabling at least some aspects of operation of the user interface element while displaying the preview; and installing the user interface element in the installation area without the frame.

20. The method of claim 19 wherein the preview designator is a carpet.

21. The method of claim 19 wherein the preview designator bounds the presentation area on at least one side.

22. The method of claim 19 wherein determining an installation area includes locating a preview area of the dashboard layer and displaying the preview of the user interface element includes displaying the user interface element in the preview area.

23. The method of claim 19 wherein the user interface element is a widget.

24. The method of claim 19 wherein the step of determining the installation area includes receiving user input designating a location on the user interface for installation.

25. A non-transitory computer-readable storage medium having instructions contained thereon, which, when executed by a processor, cause the processor to perform the operations of:

receiving input to install a user interface element in a dashboard layer overlaid on a desktop user interface;

in response to receiving the input to install the user interface element in the dashboard layer:

making the dashboard layer active;

making the desktop user interface temporarily inactive;

displaying the desktop user interface with a faded or darkened appearance to emphasize that the dashboard layer is active and that the desktop user interface is temporarily inactive;

determining an installation area in the dashboard layer to install the user interface element, the installation area including a presentation area and a frame;

displaying, in the installation area, a preview designator, where the preview designator is distinct from the user interface element and is provided to identify the user interface element as being previewed and not installed;

displaying a preview of the user interface element;

enabling at least some aspects of operation of the user interface element while displaying the preview; and installing the user interface element in the installation area without the frame.

26. A method comprising:

receiving input to install a user interface element in a dashboard layer overlaid on a desktop user interface;

in response to receiving the input to install the user interface element in the dashboard layer:

making the dashboard layer active;

making the desktop user interface temporarily inactive;

displaying the desktop user interface with a faded or darkened appearance to emphasize that the dashboard layer is active and that the desktop user interface is temporarily inactive;

determining an installation area in a user interface to install the user interface element, the installation area including a presentation area and a frame;

displaying, in the installation area, a preview designator, where the preview designator is distinct from the user interface element and is provided to identify the user interface element as being previewed and not installed;

displaying a preview of the user interface element;

enabling at least some aspects of operation of the user interface element while displaying the preview; and installing the user interface element in the installation area without the frame.

27. The method of claim 26, wherein installing the user interface element in the installation area comprises:

determining if a timeout has expired since displaying the preview of the user interface element without receiving a user interaction to cancel installation; and upon determining that the timeout has expired, installing the user interface element without the preview designator in the dashboard layer.

28. The method of claim 26 further comprising determining a plurality of user interface elements to install, and for each element performing the steps of displaying a preview and installing the respective user interface element.

29. The method of claim 28 further comprising serially installing the plurality of user interface elements.

30. The method of claim 26 wherein the installation area is in the dashboard layer.

31. A non-transitory computer-readable storage medium having instructions contained thereon, which, when executed by a processor, cause the processor to perform the operations of:

receiving input to install a user interface element in a dashboard layer overlaid on a desktop user interface;

in response to receiving the input to install the user interface element in the dashboard layer:

making the dashboard layer active;

making the desktop user interface temporarily inactive;
displaying the desktop user interface with a faded or darkened appearance to emphasize that the dashboard layer is active and that the desktop user interface is temporarily inactive;
determining an installation area in a user interface to install the user interface element, the installation area including a presentation area and a frame;
displaying, in the installation area, a preview designator, where the preview designator is distinct from the user interface element and is provided to identify the user interface element as being previewed and not installed;
displaying a preview of the user interface element;
enabling at least some aspects of operation of the user interface element while displaying the preview; and
installing the user interface element in the installation area without the frame.

32. The medium of claim 31, wherein installing the user interface element in the installation area comprises:
determining if a timeout has expired since displaying the preview of the user interface element without receiving a user interaction to cancel installation; and upon determining that the timeout has expired, installing the user interface element without the preview designator in the dashboard layer.

33. The medium of claim 31, the operations further comprising determining a plurality of user interface elements to install, and for each element performing the steps of displaying a preview and installing the respective user interface element.

34. The medium of claim 33, the operations further comprising serially installing the plurality of user interface elements.

35. The medium of claim 31 wherein the installation area is in the dashboard layer.

36. A system comprising:
a processor; and
a computer-readable storage medium coupled to the processor and having instructions contained thereon, which, when executed by the processor, cause the processor to perform the operations of:
receiving input to install a user interface element in a dashboard layer overlaid on a desktop user interface;
in response to receiving the input to install the user interface element in the dashboard layer:
making the dashboard layer active;
making the desktop user interface temporarily inactive;
displaying the desktop user interface with a faded or darkened appearance to emphasize that the dashboard layer is active and that the desktop user interface is temporarily inactive;
determining an installation area in a user interface to install the user interface element, the installation area including a presentation area and a frame;
displaying, in the installation area, a preview designator, where the preview designator is distinct from the user interface element and is provided to identify the user interface element as being previewed and not installed;
displaying a preview of the user interface element;
enabling at least some aspects of operation of the user interface element while displaying the preview; and
installing the user interface element in the installation area without the frame.

37. The system of claim 36, wherein installing the user interface element in the installation area comprises:
determining if a timeout has expired since displaying the preview of the user interface element without receiving a user interaction to cancel installation; and upon determining that the timeout has expired, installing the user interface element without the preview designator in the dashboard layer.

38. The system of claim 36, the operations further comprising determining a plurality of user interface elements to install, and for each element performing the steps of displaying a preview and installing the respective user interface element.

39. The system of claim 38, the operations further comprising serially installing the plurality of user interface elements.

40. The system of claim 36 wherein the installation area is in the dashboard layer.

41. A method comprising:
receiving input to install a user interface element in a dashboard layer overlaid on a desktop user interface;
in response to receiving the input to install the user interface element in the dashboard layer:
making the dashboard layer active;
making the desktop user interface temporarily inactive;
displaying the desktop user interface with a faded or darkened appearance to emphasize that the dashboard layer is active and that the desktop user interface is temporarily inactive;
determining a preview area in a user interface to install the user interface element, the preview area including a presentation area and a frame;
displaying, in the preview area, a preview designator, where the preview designator is distinct from the user interface element and is provided to identify the user interface element as being previewed and not installed;
displaying a preview of the user interface element;
enabling at least some aspects of operation of the user interface element while displaying the preview; and
installing the user interface element in the installation area without the frame.

42. The method of claim 41 further comprising sizing the presentation area in accordance with the user interface element.

43. The method of claim 42 further comprising sizing the preview designator in accordance with the sizing of the presentation area.

44. The method of claim 41 further comprising receiving user interaction to resize the user interface element during the preview, and resizing the presentation area in accordance with the resized user interface element.

45. The method of claim 41 further comprising:
accentuating the display of one or more of the preview designator and the user interface element during the preview.

46. The method of claim 41 further comprising:
de-emphasizing one or more user interface elements in the display environment while previewing the user interface element.

47. The method of claim 41 further comprising:
emphasizing the display of one or more of one or more of the preview designator and the user interface element during the preview.

48. A non-transitory computer-readable storage medium having instructions contained thereon, which, when executed by a processor, cause the processor to perform the operations of:

receiving input to install a user interface element in a dashboard layer overlaid on a desktop user interface;

in response to receiving the input to install the element in the dashboard layer:

making the dashboard layer active;

making the desktop user interface temporarily inactive;

displaying the desktop user interface with a faded or darkened appearance to emphasize that the dashboard layer is active and that the desktop user interface is temporarily inactive;

determining a preview area in a user interface to install the user interface element, the preview area including a presentation area and a frame;

displaying, in the preview area, a preview designator, where the preview designator is distinct from the user interface element and is provided to identify the user interface element as being previewed and not installed;

displaying a preview of the user interface element;

enabling at least some aspects of operation of the user interface element while displaying the preview; and installing the user interface element in the installation area without the frame.

49. The medium of claim 48, the operations further comprising sizing the presentation area in accordance with the user interface element.

50. The medium of claim 49, the operations further comprising sizing the preview designator in accordance with the sizing of the presentation area.

51. The medium of claim 48, the operations further comprising receiving user interaction to resize the user interface element during the preview, and resizing the presentation area in accordance with the resized user interface element.

52. The medium of claim 48, the operations further comprising:

accentuating the display of one or more of the preview designator and the user interface element during the preview.

53. The medium of claim 48, the operations further comprising:

de-emphasizing one or more user interface elements in the display environment while previewing the user interface element.

54. The medium of claim 48, the operations further comprising:

emphasizing the display of one or more of one or more of the preview designator and the user interface element during the preview.

55. A system comprising:

a processor; and a computer-readable storage medium coupled to the processor and having instructions contained thereon, which, when executed by the processor, cause the processor to perform the operations of:

receiving input to install a user interface element in a dashboard layer overlaid on a desktop user interface;

in response to receiving the input to install the user interface element in the dashboard layer:

making the dashboard layer active;

making the desktop user interface temporarily inactive;

displaying the desktop user interface with a faded or darkened appearance to emphasize that the dashboard layer is active and that the desktop user interface is temporarily inactive;

determining a preview area in a user interface to install the user interface element, the preview area including a presentation area and a frame;

displaying, in the preview area, a preview designator, where the preview designator is distinct from the user interface element and is provided to identify the user interface element as being previewed and not installed;

displaying a preview of the user interface element;

enabling at least some aspects of operation of the user interface element while displaying the preview; and installing the user interface element in the installation area without the frame.

* * * * *

UNITED STATES PATENT AND TRADEMARK OFFICE
CERTIFICATE OF CORRECTION

PATENT NO.        : 8,543,931 B2
APPLICATION NO.   : 11/282110
DATED             : September 24, 2013
INVENTOR(S)       : Scott Forstall et al.

It is certified that error appears in the above-identified patent and that said Letters Patent is hereby corrected as shown below:

On Title Page 4, In Column 2 (Other Publications), In Line 2, Delete "grahics" and insert -- graphics --, therefor.

On Title Page 4, In Column 2 (Other Publications), In Line 36, Delete "Writen" and insert -- Written --, therefor.

On Title Page 5, In Column 2 (Other Publications), In Line 61, Delete "grahics" and insert -- graphics --, therefor.

On Title Page 6, In Column 1 (Other Publications), In Line 27, Delete "kyword" and insert -- keyword --, therefor.

On Title Page 6, In Column 1 (Other Publications), In Line 62, Delete "Interntional" and insert -- International --, therefor.

On Title Page 6, In Column 1 (Other Publications), In Line 65, Delete "Interntional" and insert -- International --, therefor.

On Title Page 6, In Column 2 (Other Publications), In Line 56, Delete "information" and insert -- Information --, therefor.

On Title Page 6, In Column 2 (Other Publications), In Line 57, Delete "Intrnet" and insert -- Internet --, therefor.

On Title Page 6, In Column 2 (Other Publications), In Line 68, Delete "Gallactica" and insert -- Gallatic --, therefor.

On Title Page 7, In Column 2 (Other Publications), In Line 5, Delete "widipedia" and insert -- Wikipedia --, therefor.

Signed and Sealed this
First Day of April, 2014

Michelle K. Lee
*Deputy Director of the United States Patent and Trademark Office*

CERTIFICATE OF CORRECTION (continued)
U.S. Pat. No. 8,543,931 B2

In the Claims:

In Column 26, In Line 65, In Claim 47, after "of one or more" delete "of one or more".

In Column 28, In Line 8, In Claim 54, after "of one or more" delete "of one or more".